United States Patent
Kurano et al.

(10) Patent No.: US 7,068,913 B1
(45) Date of Patent: Jun. 27, 2006

(54) DATA PROCESSING SYSTEM, RECORDING/REPRODUCING DEVICE, DATA PROCESSING METHOD AND FILE MANAGEMENT METHOD

(75) Inventors: Yukio Kurano, Higashiosaka (JP); Masazumi Yamada, Moriguchi (JP); Akira Iketani, Higashiosaka (JP); Tatsuro Juri, Osaka (JP); Masaaki Kobayashi, Kawanishi (JP); Yoshitomi Nagaoka, Neyagawa (JP); Chiyoko Matsumi, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/355,690

(22) PCT Filed: Jan. 30, 1998

(86) PCT No.: PCT/JP98/00401

§ 371 (c)(1),
(2), (4) Date: Aug. 3, 1999

(87) PCT Pub. No.: WO98/34229

PCT Pub. Date: Aug. 6, 1998

(30) Foreign Application Priority Data

| Feb. 3, 1997 | (JP) | ............................................. 9-020198 |
| Mar. 12, 1997 | (JP) | ............................................. 9-057279 |
| Mar. 21, 1997 | (JP) | ............................................. 9-067653 |

(51) Int. Cl.
*H04N 5/91* (2006.01)

(52) U.S. Cl. .......................................... 386/46; 386/125
(58) Field of Classification Search .................. 386/33, 386/45–46, 81, 109, 111–112, 124–126
See application file for complete search history.

(56) References Cited

U.S. PATENT DOCUMENTS

| 5,550,643 A | * | 8/1996 | Azadegan | .................... 386/124 |
| 5,970,207 A | * | 10/1999 | De With et al. | ............ 386/112 |
| 5,995,707 A | * | 11/1999 | Lee | .............................. 386/81 |
| 6,434,319 B1 | * | 8/2002 | Wine | ........................... 386/46 |

FOREIGN PATENT DOCUMENTS

| JP | 4-207887 | 7/1992 |
| JP | 5-290549 | 11/1993 |
| JP | 7-141158 | 6/1995 |
| JP | 8-124295 | 5/1996 |
| JP | 8-161872 | 6/1996 |
| JP | 8-221303 | 8/1996 |

OTHER PUBLICATIONS

Office Action dated Nov. 11, 2004 from the Korean Patent Office.

* cited by examiner

*Primary Examiner*—Thai Tran
*Assistant Examiner*—Christopher Onuaku
(74) *Attorney, Agent, or Firm*—RatnerPrestia

(57) ABSTRACT

A data processing system provided with: input means for inputting stream data; management information decoding means for decoding management information transmitted together with the input data; file forming means for cutting the input data at a predetermined file length and adding part or all of the management information obtained by said management information decoding means to form a file; storage means for recording the formed file; and a cutting position definer for setting a start point and an end point of cutting of the file from the input data when the file is formed or before the file is formed, wherein the file forming means cuts the input data in accordance with the set start and end points.

79 Claims, 31 Drawing Sheets

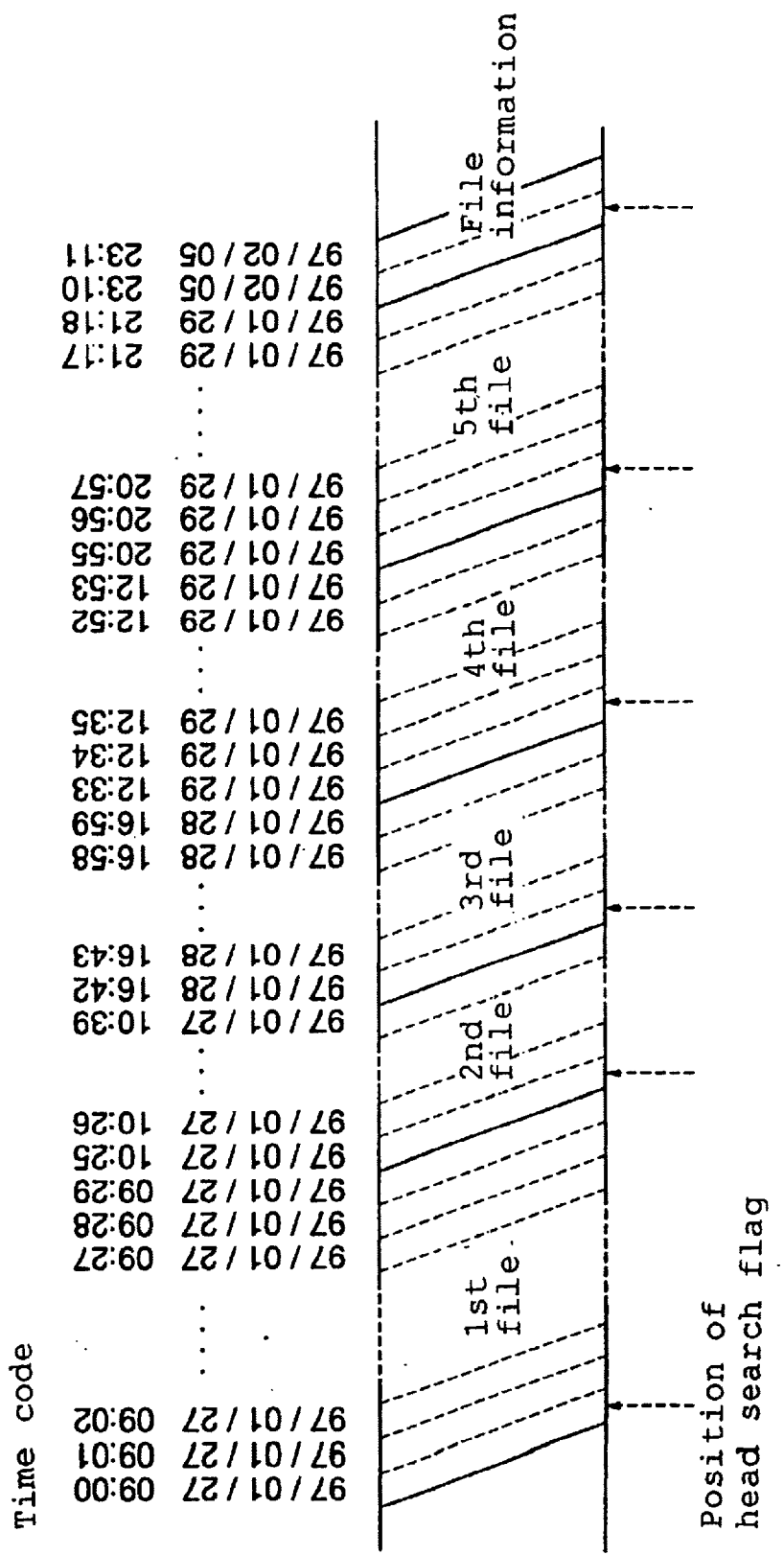

Fig. 10

| | | | |
|---|---|---|---|
| Entire file information | Cassette ID | : 5 | |
| | Cassette label | : Ski trip | |
| | File information recording position | : 97/02/05 23:10 | |
| | Number of recorded files | : 5 | |
| | Tape length | : 120 minutes | |
| | Log information | | |
| Individual file information | 1st file | File name | : 97_01_27/0900.dv |
| | | File size | : 30min. |
| | | Recording start position | : 97/01/27 09:00 |
| | | Recording data type | : Formation of VTR recording |
| | 2nd file | File name | : 97_01_27/1025.dv |
| | | File size | : 15min. |
| | | Recording start position | : 97/01/27 10:25 |
| | | Recording data type | : Formation of VTR recording |
| | 3rd file | File name | : 97_01_28/1642.dv |
| | | File size | : 18min. |
| | | Recording start position | : 97/01/28 16:42 |
| | | Recording data type | : Formation of VTR recording |
| | 4th file | File name | : 97_01_29/1233.dv |
| | | File size | : 21min. |
| | | Recording start position | : 97/01/29 12:33 |
| | | Recording data type | : Formation of VTR recording |
| | 5th file | File name | : 97_01_29/2055.dv |
| | | File size | : 24min. |
| | | Recording start position | : 97/01/29 20:55 |
| | | Recording data type | : Formation of VTR recording |

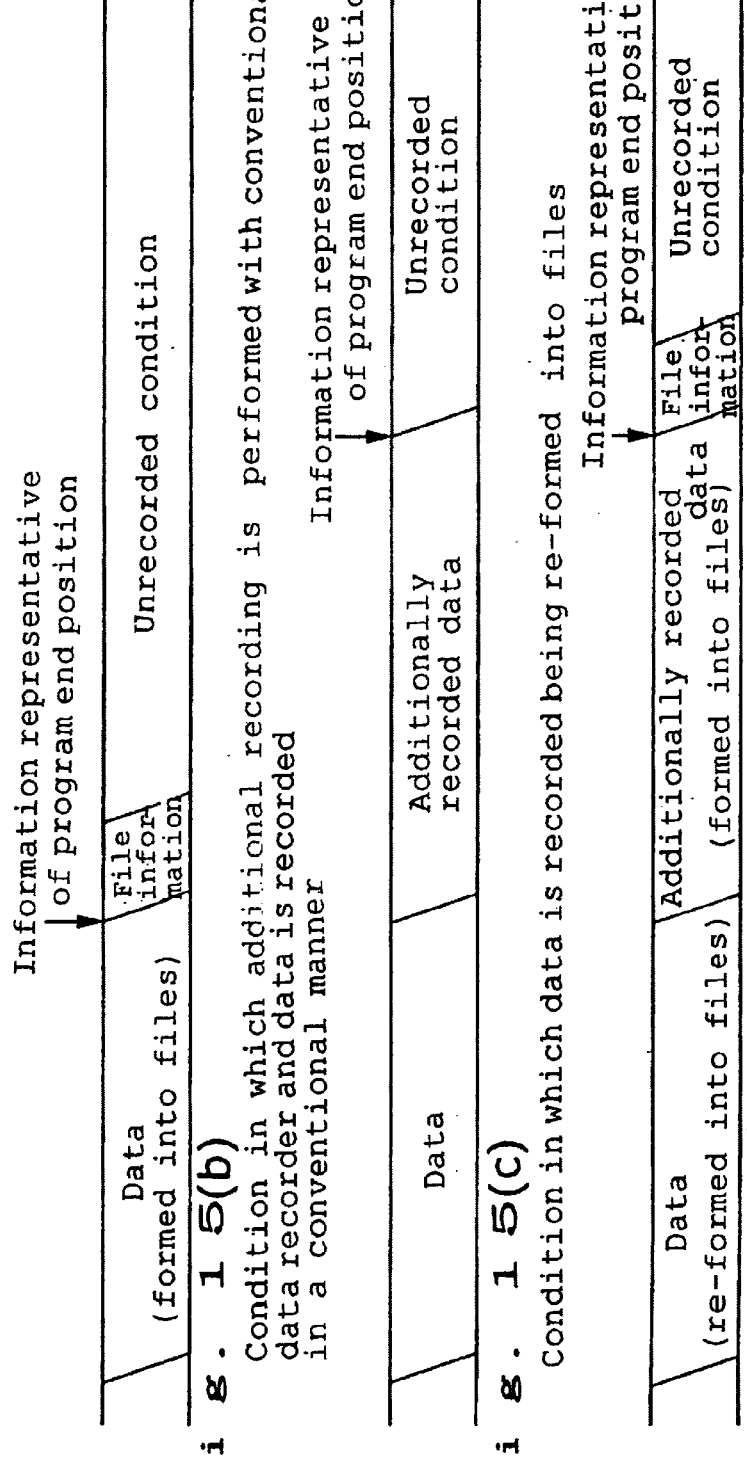

Fig. 16(a)

Condition in which data is recorded being formed into files

| Data (formed into files) | File information (COPY) ↗ File information | Unrecorded condition |

Information representative of program end position

Fig. 16(b)

Condition in which additional recording is performed with conventional data recorder and data is recorded in a conventional manner

| Data (formed into files, in abnormal state) | File information (COPY) | Additionally recorded data | Unrecorded condition |

Information representative of program end position

Fig. 16(c)

Condition in which data is recorded being re-formed into files

| Data (normally formed into files) | File information (invalid) | Additionally recorded data (formed into files) | File information (COPY) ↗ File information | Unrecorded condition |

Information representative of program end position

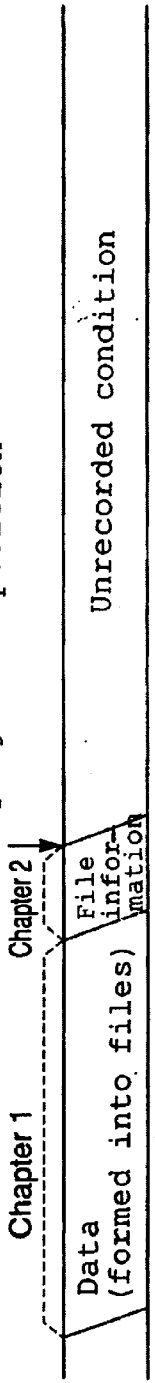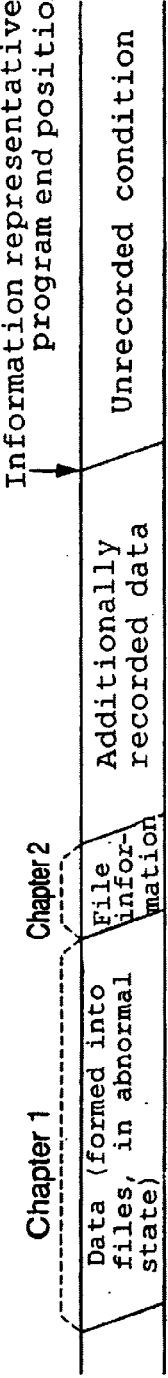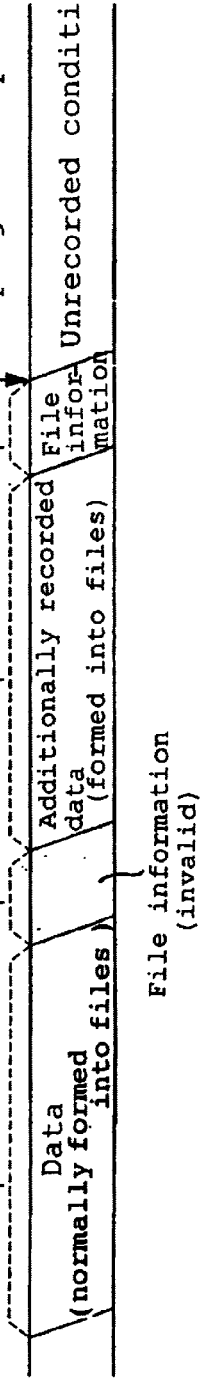
Fig. 17(a) Condition in which data is recorded being formed into files
Fig. 17(b) Condition in which additional recording is performed with conventional data recorder and data is recorded in a conventional manner
Fig. 17(c) Condition in which data is recorded being re-formed into files

DATA PROCESSING SYSTEM, RECORDING/REPRODUCING DEVICE, DATA PROCESSING METHOD AND FILE MANAGEMENT METHOD

This application is a U.S. National Phase Application of PCT International Application PCT/JP98/00401.

TECHNICAL FIELD

The present invention relates to a data processing system and a data processing method for converting data when image and audio(sound) digital stream data is input to a computer, and converting data when data input to a computer is output to an external device to a recorder/reproducer for recording digital data such as images, sounds and computer data on a recording medium such as magnetic tape, and to a managing method for managing recorded digital data as files.

BACKGROUND ART

Presently, DVCs and DVDs using magnetic tape are among media for storing multimedia information including images and sounds. It is becoming possible to connect a storage medium such as a DVC or a DVD and a computer by use of a digital interface typified by the IEEE1394. A set-top box is a device for receiving digital stream data from a broadcasting station. Data transmitted from a set-top box, a DVC and a, DVD to a computer through a digital interface is stream-format data and is a stream of continuous data. However, the continuous stream data cannot be captured in a computer and handled in a similar manner to other existing computer files as it is.

For example, for a recording medium where recording is performed with a recorder/reproducer such as a DVC, recording is performed, for example, while providing a time code representative of the recording date and time every predetermined unit of the video signal. Here, the time code is in minutes. Although the time code may be in seconds, it is generally in units of a frame/field. Moreover, a head search flag can be recorded at the point of time when a series of recording is started. In the above-described recorder/reproducer, however, only the person that recorded the data knows the contents of the recorded data, and further, it is required to label the recording medium or to put a list in a cassette case and keep it together with the recording medium. In actually reproducing the data, when the recording medium is tape, to find where the data is recorded, it is necessary to perform a search while confirming the contents in fast forward, which is inconvenient.

To solve this problem, an object of the present invention is to provide a data processing system and a data processing method in which files that can be handled by computers can be formed and the contents of the recorded data can easily be confirmed.

Moreover, in particular, examining the use of a DVC as a computer storage medium like existing hard disks and floppy disks by connecting it to a computer, in existing digital VTRs, only video signals and sound signals of a predetermined format can be recorded. Moreover, some media have a special streamer format for recording PC file data in a recording medium like 8-mm tape and DAT tape. However, since the tape where recording is performed in the streamer mode is different in format from the existing 8-mm tape and DAT tape, when the tape where recording is performed in the streamer mode is set in an 8-mm or DAT deck, problems arise such that the tape is erroneously recognized and that noise is caused.

Moreover, for example, a function is not provided such as access to each file, which is possible in a hard disk connected to a PC, and it is difficult to easily find the contents and quickly access the position of the contents which the user intends to view.

In view of this conventional problem an object of the present invention is to provide a file managing method and a recorder/reproducer in which the existing digital VCR format is capitalized on, functions of access in units of file and recording of data files other than video signals and sound signals of the predetermined digital VCR format are enabled, and tape where a data file is recorded can be viewed with existing digital VCR decks without any problem.

DISCLOSURE OF THE INVENTION

A data processing system of one aspect of the present invention comprises: input means for inputting stream data; file forming means for cutting the input data at a predetermined file length into a file and assigning a file name to the file; and storage means for recording the formed file.

A data processing system of one aspect of the present invention comprises: input means for inputting stream data; management information analyzing means for analyzing management information transmitted together with the input data; file forming means for cutting the input data at a predetermined file length and adding part or all of the management information obtained by said management information decoding means to form a file; and storage means for recording the formed file.

A data processing method of another aspect of the present invention is for a system in which a recorder and a receiver are connected and data processing is performed when recording data is transmitted from the recorder to the receiver, wherein in the data processing, a transmission method is switched in accordance with management information added to the transmitted recording data and a type of the receiver.

According to the above-described present invention, the stream data input from an external device can be converted into a computer file format, and a file name can automatically be assigned to the formed computer-file-format file data.

Moreover, by performing recording with the management information of the stream data being managed for each file or with only the management information being collectively managed when the data is captured in a computer, access such as file search can easily be performed.

Moreover, by providing a function of analyzing the management information and a function of verifying the result of the analysis and the method by which the succeeding processor can perform processing, processing can automatically be performed without the user selecting a processing method.

A file managing method of still another aspect is such that an image to which information on recording date and time is added is reproduced from a recording medium on which the image is recorded, a recording discontinuity position of the image recorded on the recording medium is detected, the image is divided at the detected recording discontinuity position to form files, and certain file information is generated.

A data recorder for recording digital data of yet another aspect comprises: reproducing means for reproducing an image to which information on recording date and time is added from a recording medium on which the image is recorded; detecting means for detecting a recording discontinuity position of the image recorded on the recording medium; and forming-image-into-file means for dividing the image at the detected recording discontinuity position to form files and generating certain file information for each of the files.

A file managing method of still yet another aspect is such that by use of a data recorder in which data is recorded from a head of a recording medium and recording end position information representative of a position where recording is ended can be recorded, file information with the data as a file is generated, data is managed so that the file information is recorded after the data is recorded, and a position where the recording of the data is ended is managed as the recording end position information.

A file managing method of a further aspect of the present invention is such that by use of a data recorder in which data is recorded from a head of a recording medium and recording end position information representative of a position where recording is ended can be recorded, file information with the data as a file is generated, data is managed so that the file information is repetitively recorded twice after the data is recorded, and a position where the recording of the file information is ended is managed as the recording end position information.

A file managing method of a still further aspect is such that by use of a data recorder in which data is recorded from a head of a recording medium while being divided into at least one area, and recording end position information representative of a position where recording is ended can be recorded, file information with the data as a file is generated, data is managed so that the file information is recorded as a different area after the data is recorded, and a position where the first recording of the file information is ended is managed as the recording end position information.

A data recorder of a yet further aspect in which data is recorded from a head of a recording medium while being divided into at least one area, and recording end position information representative of a position where recording is ended can be recorded, said data recorder comprises:

file information generating means for generating file information with the data as a file; first recording means for recording the data and the file information; and second recording means for recording the recording end position information.

According to the above-described present invention, by recording the file information, recorded data can be managed being formed into a file, so that when the cassette is once taken out and then, reproduced again, the contents recorded on the recording medium can easily be confirmed.

Moreover, processing such as dubbing, edits, deletion and division of the recorded data can easily be performed. When data on a frame is used as the file information, the contents of the data can be confirmed as an image, so that confirmation is facilitated.

A recorder/reproducer of a still yet further aspect of the present invention is for recording and reproducing a digital video and audio coded signal of a predetermined format onto and from a recording medium in units of a predetermined recording packet, in which of the digital video and audio coded signal, a codeword of a direct current component of each of small blocks constituting a frame is present in a fixed position in the recording packet, wherein an end-of-block code representing that the codeword of the small block is discontinued hereinafter at the code is disposed in an area to which the codeword of the small block is assigned, a part of the area to which the codeword of the small block is assigned, which part is behind the end-of-block code is set as a general-purpose data recording area, and the input data is assigned to the general-purpose data recording area.

A recorder/reproducer of one aspect of the present invention is for recording And reproducing a digital video and audio coded signal of a predetermined format onto and from a recording medium in units of a predetermined recording packet, in which of the digital video and audio coded signal, a direct current component of each of blocks constituting a frame, class information defining a method of quantizing the small blocks and motion information which is information on motion of each small block from a previous frame are present in a fixed position in the recording packet, wherein a part of the area to which the codeword of the small block is assigned, which part is behind an end-of-block code, an area where the class information is recorded and an area where the motion information is recorded are set as a general-purpose data recording area, and the input data is assigned to the general-purpose data recording area.

A converting method of another aspect for converting input data into a format of a digital videos and audio coded signal having units of a predetermined transmission packet, where a direct current component of each of small blocks constituting a frame is present in a fixed position in the transmission packet, wherein an end-of-block code is added in an area where a codeword of each of the small blocks is disposed, a part of the area where the codeword of the small block is disposed, which part is behind the end-of-block code is set as a general-purpose data disposition area, and the data is disposed in the general-purpose data disposition area and converted.

A converting method of still another aspect is for converting input data into a format of a digital video and audio coded signal having units of a predetermined transmission packet, where a direct current component of each of small blocks constituting a frame, class information and motion information are present in a fixed position in the transmission packet, wherein a part of an area where a codeword of the small block is disposed, which part is behind the end-of-block code, an area where the class information is recorded and an area where the motion information is recorded are set as a general-purpose data disposition area, and the data is disposed in the general-purpose data disposition area and converted.

According to the above-described present invention, by capitalizing on a characteristic that the position of the codeword of the direct current component which is the start position of each small block is fixed and when the end-of-block code is added, the area from there to the start position of the next small block becomes a data area-invalid for decoding and reproduction of the existing digital VTR, data files other than the video and audio coded signal of the predetermined format can be recorded. Moreover, since the data oh the recording medium is the same as the transmission and recording format of the recording medium and the data file portion is skipped as an invalid data area by the reproducer/decoder of the existing digital VTR deck, the tape on which data files are recorded can be viewed with the existing digital VTR deck without any problem.

Moreover, when data files other than the video and audio coded signal of the predetermined format are recorded, since it is unnecessary to use the areas of the class information and the motion information in addition to the end-of-block code, they can be used for data file recording together.

A converting method of yet another aspect is for using as an input signal a digital video and audio coded signal having units of a certain transmission packet of a format where a codeword of a direct current component of each of small blocks constituting a frame is present in a fixed position in the transmission packet, wherein a part of an area where the codeword of the small block of the input signal is disposed, which part is behind an end-of-block code is set as a general-purpose data area, and data is output from the general-purpose data area.

A converting method of still yet another aspect is for using as an input signal a digital video and audio coded signal having units of a predetermined transmission packet of a format where a codeword of a direct current component of each of small blocks constituting a frame, class information and motion information are present in a fixed position in the transmission packet, wherein a part of an area where the codeword of the small block of the input signal is disposed, which part is behind an end-of-block code, an area where the class information is recorded and an area where the motion information is recorded are set as a general-purpose data area, and data is output from the general-purpose data areas.

According to one aspect of the present invention a codeword of a direct current component which codeword is a start position of each of small blocks is present in a fixed position and an end-of-block is added and then by utilizing such characteristics that an area from said end-of-block to a start position of the next small block is invalid data area for decoding and reproducing of conventional digital VTR, data file can be output from a recording medium recorded with data file other than a certain type of video and audio coded signal.

According to another aspect of the present invention data file can be reproduced by using the class information and the motion information as well as the codeword of end-of-block signal.

A recorder/reproducer of still another aspect is for recording and reproducing a digital video and audio coded signal of a predetermined format in units of a predetermined recording packet, in which of the digital video and audio coded signal, a codeword of a direct current component in codewords of each of small blocks constituting a frame is present in a fixed position in the recording packet, wherein an end-of-block code is disposed in an area to which the codeword of each small block in a predetermined track is assigned, a part of the area to which the codeword of the small block is assigned, which part is behind the end-of-block code, is set as a file management information recording area, and file management information which is information on files recorded in a recording medium is assigned to the file management information recording area.

A recorder/reproducer of yet another aspect is for recording and reproducing a digital video and audio coded signal of a predetermined format in units of a predetermined recording packet, in which of the digital video and audio coded signal, a direct current component of each of small blocks constituting a frame, class information and motion information are present in a fixed position in the recording packet, wherein a part of an area to which a codeword of each small block is assigned, which part is behind an end-of-block code, an area where the class information is recorded and an area where the motion information is recorded are set as a file management information recording area, and file management information is assigned to the file management information recording area.

A converting method of still yet another aspect is for converting input data into a format of a digital video and audio coded signal having units of a predetermined transmission packet, where a direct current component of each of small blocks constituting a frame is present in a fixed position in the transmission packet, wherein an end-of-block code is added in an area where a codeword of each small block is disposed, a part of the area where the codeword of the small block is disposed, which part is behind the end-of-block code is set as a file management information area, and conversion is performed with file management information on the data being disposed in the file management information area.

A converting method of a further aspect of the present invention is for converting input data into a format of a digital video and audio coded signal having units of a predetermined transmission packet, where a direct current component of each of small blocks constituting a frame, class information and motion information are present in a fixed position in the transmission packet, wherein a part of an area where a codeword of the small block is disposed, which part is behind the end-of-block code, an area where the class information is recorded and an area where the motion information is recorded are set as a file management information area, and conversion is performed with file management information on the data being disposed in the file management information area.

A converting method of a still further aspect is for using as an input a digital video and audio coded signal having units of a predetermined transmission packet, where a codeword of a direct current component of each of small blocks constituting a frame is present in a fixed position in the transmission packet, wherein file management information is output from a part of an area where the codeword of the small block of the input signal is disposed, which part is behind an end-of-block code.

A converting method of a yet further aspect is for using as an input a digital video and audio coded signal having units of a predetermined transmission packet, where a direct current component of each of small blocks constituting a frame, class information and motion information are present in a fixed position in the transmission packet, wherein file management information is output from a part of an area where a codeword of the small block of the input signal is disposed, which part is behind an end-of-block code, an area in which the class information is recorded and an area in which motion information is recorded.

According to the above-described present invention, by setting an area similarly to the area provided for recording of data files and recording management information of each file, for example, the name of the file, the update date and time of the file, the file start position information, the file size, the file end position information or the track number information, a function such as access in units of file which is possible in a hard disk connected to a PC can be realized, and it is possible to easily find the contents of data in a recording medium and to quickly access to the position of the contents that the user intends to view.

Here, files are not only data files; data of the existing digital VTR can be handled similarly to data files by deciding the file start position, the file end position or the track number as one file unit and adding the name, the update date and time and the like.

BRIEF DESCRIPTION OF THE DRAWINGS

FIG. 9 is a view showing a condition of a recording medium where recording is performed with the data recorder according to the fourth embodiment;

FIG. 10 is a view showing an example of individual file information/entire file information generated/managed by the data recorder according to the fourth embodiment;

FIG. 15 is a view showing a condition of a recording medium where recording is performed with a data recorder according to the sixth embodiment;

FIG. 16 is a view showing a condition of a recording medium where recording is performed with a data recorder according to the sixth embodiment;

FIG. 17 is a view showing a condition of a recording medium where recording is performed with the data recorder according to the sixth embodiment;

BEST MODE FOR CARRYING OUT THE INVENTION

Hereinafter, embodiments of the present invention will be described with the above figures.

(First Embodiment)

Figure 1:
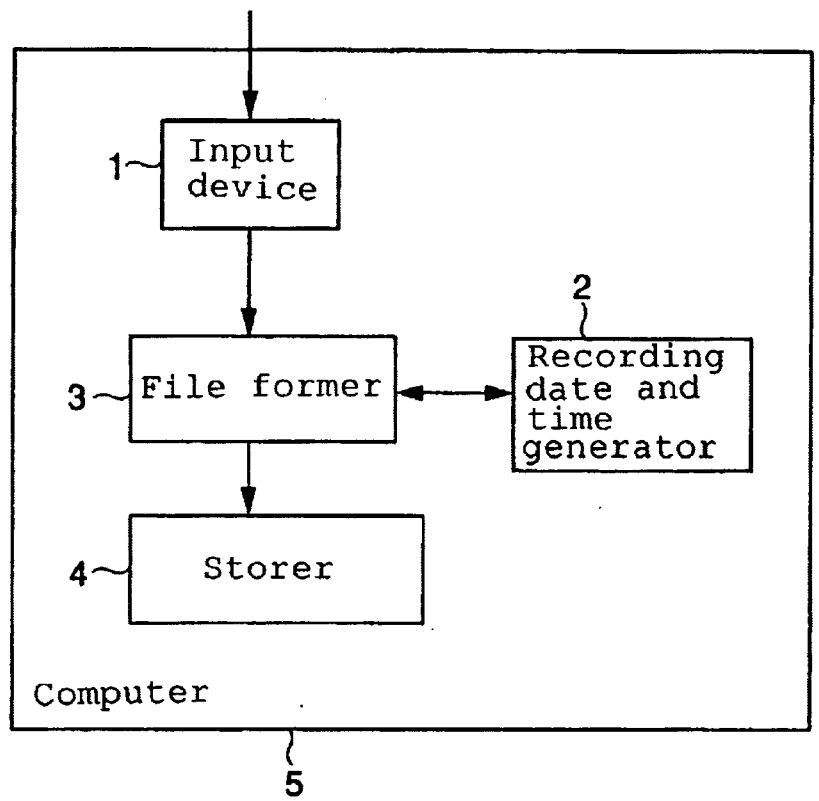
FIG. 1 is a block diagram of the structure of an apparatus for a first embodiment of the present invention.

FIG. 1 is a block diagram of a data processing system according to a first embodiment of the present invention. In FIG. 1, reference numeral 1 represents an input device, reference numeral 2 represents a recording date and time generator, reference numeral 3 represents a file former, reference numeral 4 represents a storer, and reference numeral 5 represents a computer. Hereinafter, the elements denoted by the same reference numerals have the same structures and functions.

The operation of the data processing system structured as described above will be described below.

Figure 2:
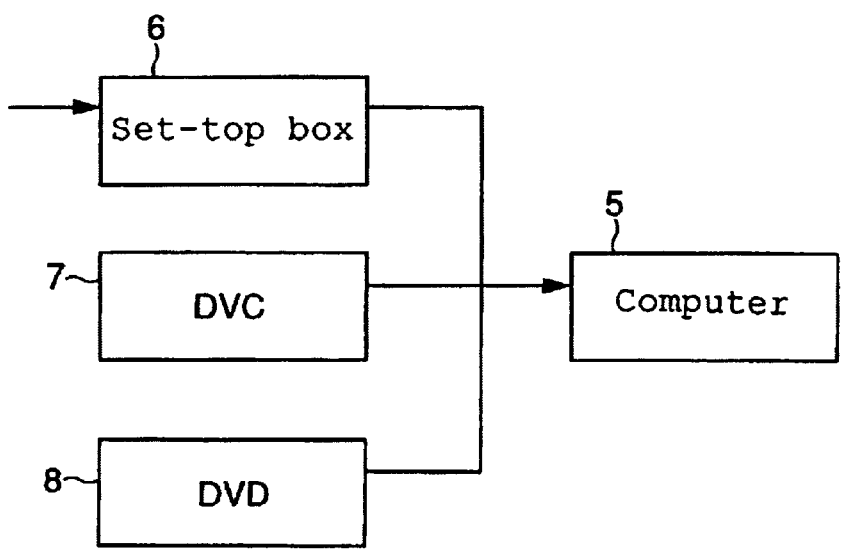
FIG. 2 is a block diagram showing connection between external devices and a computer.

Input data is input from an external device to the input device 1 in the computer 5. FIG. 2 shows connection between the computer 5 and external devices. In FIG. 2, reference numeral 6 represents a set-top box, reference numeral 7 represents a DVC, and reference numeral 8 represents; a DVD. The set-top box 6, the DVC7 and the DVD8 are each connected to the computer 5 through a digital interface such as the IEEE1394, and data is transmitted from the set-top box 6, the DVC7 and the DVD8 to the input device 1 in the computer 5. The input data is stream data that is not clearly divided in units of file.

The file former 3 is a device that converts the input data transmitted from the input device 1 into a computer file of an arbitrary size.

When the input data is input to the file former 3 and a computer file is formed, the recording date and time generator 2 generates the date and time of the file formation, and transmits the date and time data to the file former 3.

The file former 3 cuts stream-format input data into a file of a fixed length. Moreover, the file former 3 assigns a file name, by use of the date and time data, to the file being cut. For example, when the date and time of the file formation by the file former 3 is 26 minutes 37 seconds past sixteen, Jan. 23, 1997, the file name is "970123162637.KRN".

The computer data of the original input data to which the file name has been assigned by the file former 3 is recorded in the storer 4, and is thereafter handled equally to other normal computer files.

In this embodiment, when stream-format input data from an external device is stored in the storer 4 in the computer 5, the data is stored in a file format and an arbitrary file name is automatically assigned thereto, so that the data can be handled similarly to other computer files in the computer 5.

Figure 3:
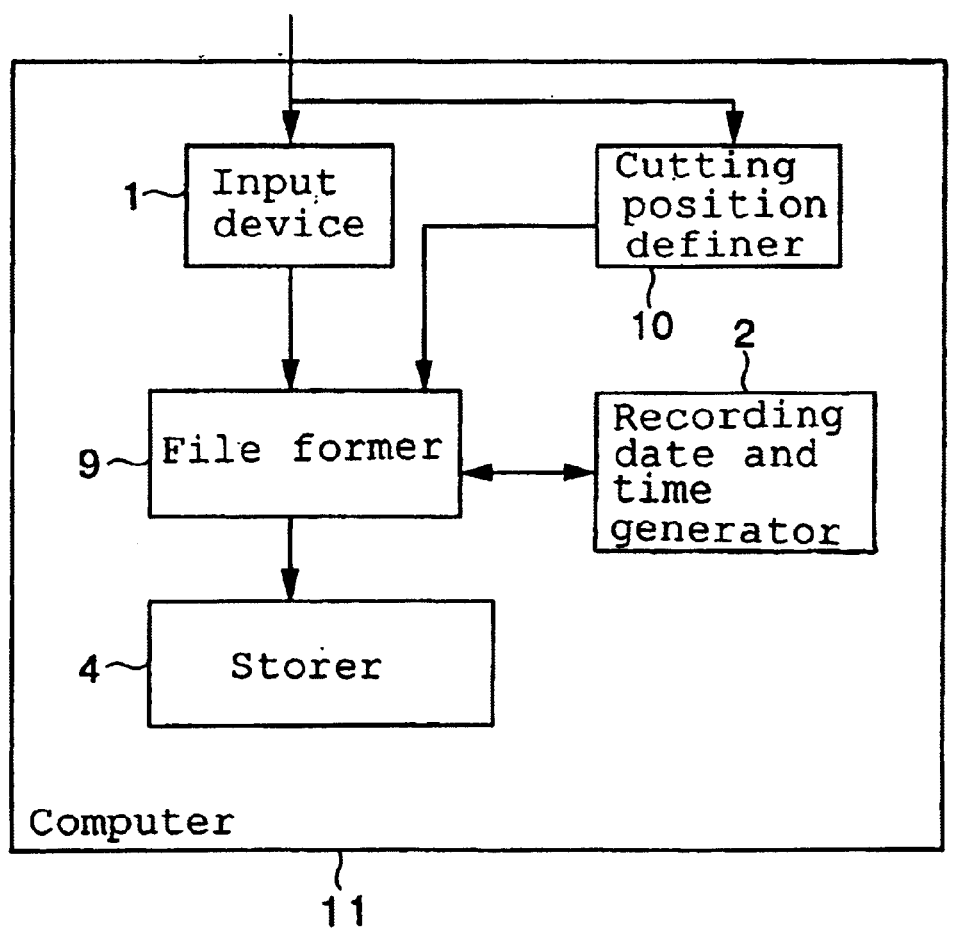
FIG. 3 is a block diagram of the structure of an apparatus including a device for defining a stream data cutting position.

While in this embodiment, the file former 3 cuts stream-format input data as a file of a fixed length, the file cutting manner is arbitrary. FIG. 3 is a structural view of a computer having a cutting position specifying function. In FIG. 3 1 reference numeral 9 represents a file former, reference numeral 10 represents a cutting position definer, and reference numeral 11 represents a computer. In the cutting position definer 10, the start position and the end position of file cutting from stream-format input data are recorded in advance when or before the input data is input to the computer 11. The information is transmitted to the file former 9 and a file is formed based on the information.

Figure 4:
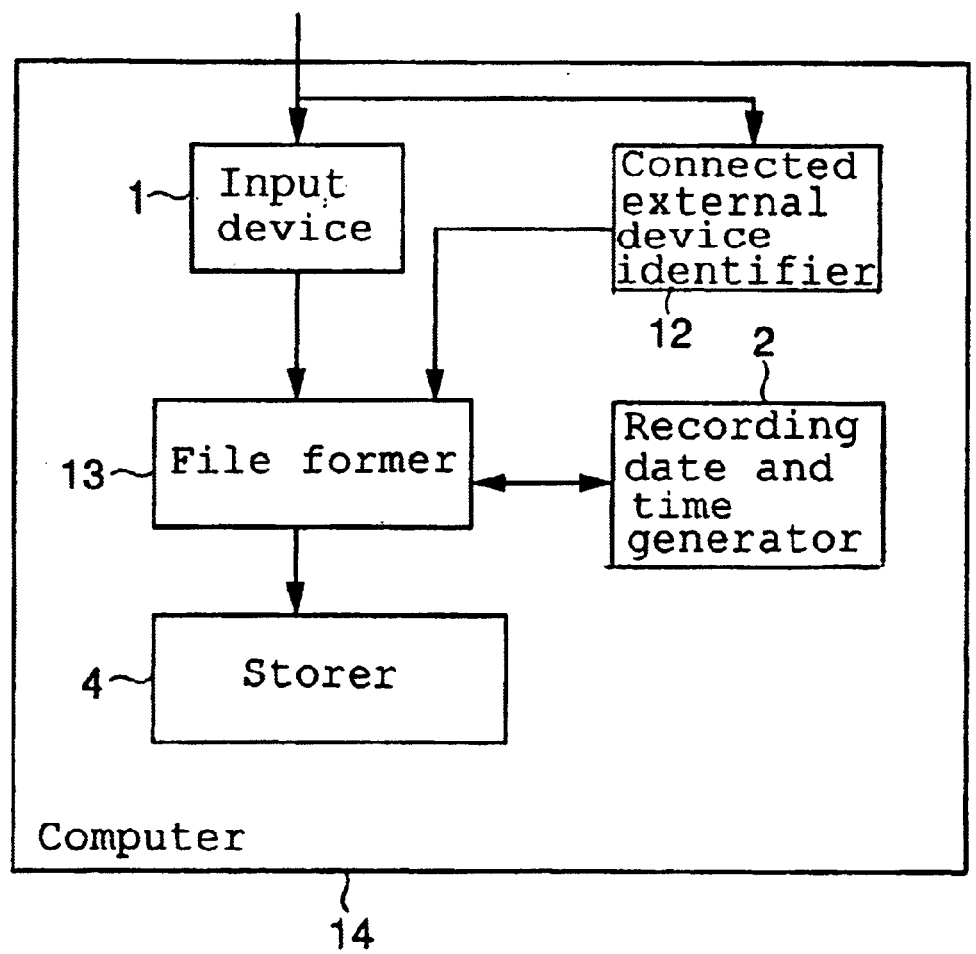
FIG. 4 is a block diagram of the structure of an apparatus including a device for analyzing the name and the type of a connected external device.

While the date and time of recording onto the computer 5 is used as the file name in this embodiment, the file name can be assigned based on the name or the type of the external device supplying the input data in addition to the above-described method. FIG. 4 is a block diagram of a data processing system in which the file name is assigned based on the name or the type of the external device. In FIG. 4, reference numeral 12 represents a connected external device identifier, reference numeral 13 represents a file former, and reference numeral 14 represents a computer. The data input to the computer 14 is transmitted to the file former 13 through the connected external device identifier 12 and the input device 1. The connected external device identifier 12 analyzes information on the data inputting external device which information is multiplexed in the input data, identifies the connected external device, and inputs the result of the identification to the file former 13. The file former 13 forms a computer file by cutting the input data, and assigns a file name based on the information obtained by the connected external device identifier 12. For example, when the external device is a DVD, the file name is "DVD.KRN".

While in FIG. 4, the external device is identified by the connected external device identifier 12 and a filename in accordance with the external device is assigned, the file name can be assigned by use of management information of the input data transmitted being multiplexed in the input data.

Figure 5:
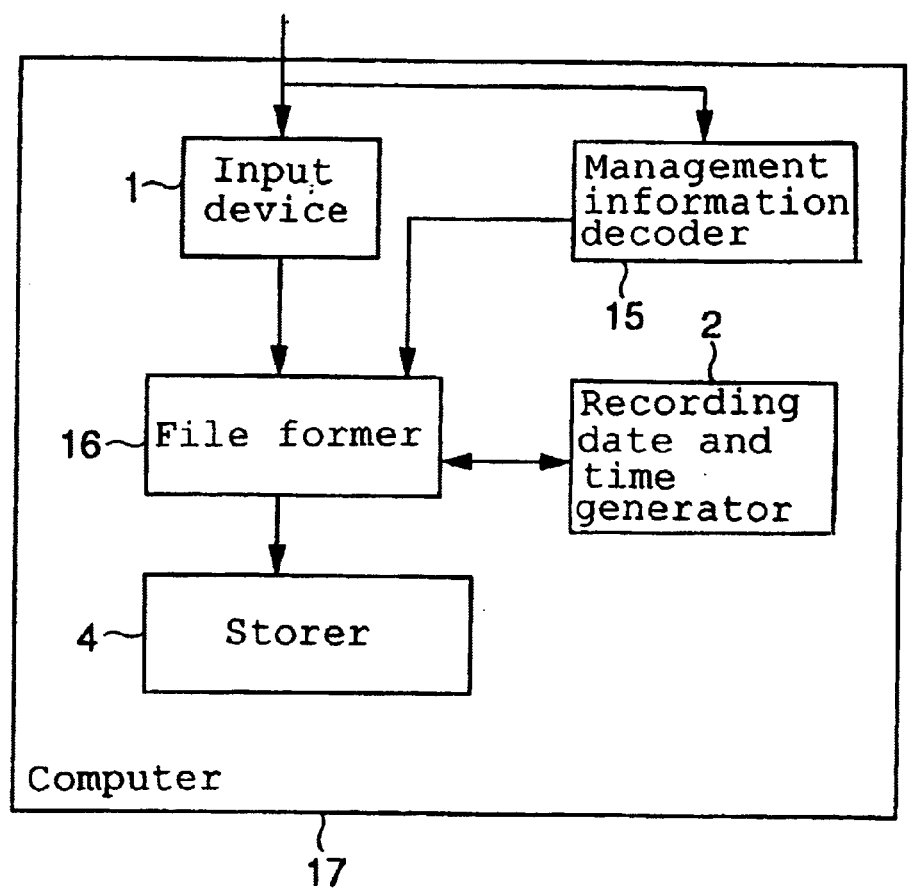
FIG. 5 is a block diagram of the structure of an apparatus including a device for analyzing management information in stream data.

FIG. 5 is a block diagram of a data processing system in which the file name is assigned based on the management information of the input data transmitted being multiplexed in the input data. In FIG. 5, reference numeral 15 represents a management information decoder, reference numeral 16 represents a file former, and reference numeral 17 represents a computer.

The data input to the computer 17 is transmitted to the file former 16 through the management information decoder 15 and the input device 1. The management information decoder 15 captures the input data, extracts the management information on the input data multiplexed therein, and inputs the extracted management information to the file former 16. The file former 16 forms a computer file by cutting the input data, and assigns a file name based on the information obtained by the management information decoder 15, for example, the date and time of formation of the input data or the program name of the input data.

(Second Embodiment)

Figure 6:
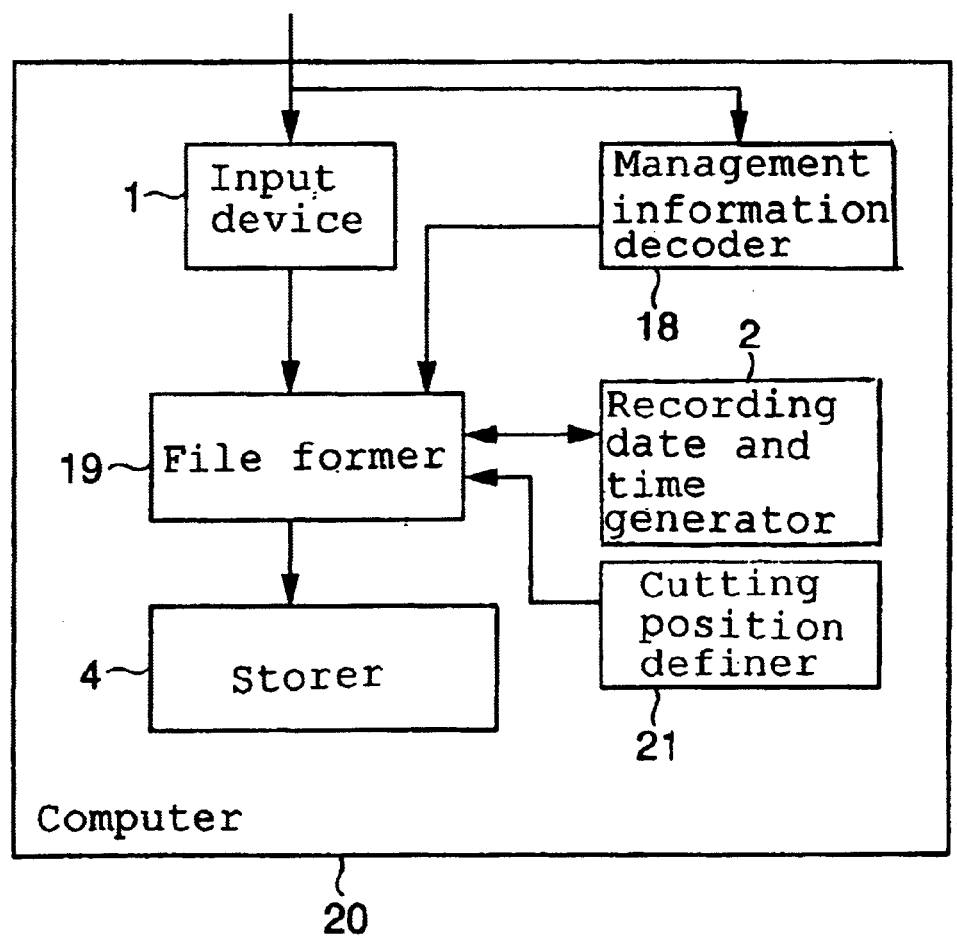
FIG. 6 is a block diagram of the structure of an apparatus for a second embodiment of the present invention.

FIG. 6 is a block diagram of a data processing system according to a second embodiment of the present invention.

In FIG. 6, reference numeral 18 represents a management information decoder, reference numeral 19 represents a file former, reference numeral 20 represents a computer, and reference numeral 21 represents a cutting position definer.

The operation of the data processing system structured as described above will be described below.

Input data is input from an external device to the input device 1 in the computer 20. Like in the first embodiment, the computer 20 is connected to the external device through the input device 1 as shown in FIG. 2.

The data input to the computer 20 is transmitted to the file former 19 through the management information decoder 18 and the input device 1. The management information decoder 18 captures the input data, extracts the management information of the input data multiplexed therein, and inputs the extracted management information to the file former 19. To the file former 19, the start position and the end position of cutting of the stream-format input data as a file are input from the cutting position definer 21. The file start and end positions in the stream defined by the cutting position definer 21 are set in advance when or before the input data is input to the computer 20.

The file former 19 forms a computer file from the input data. Part or all of the management information input from the management information decoder 18 is added to each file formed here.

According to the second embodiment, stream-format input data input from an external device is recorded in a file (hereinafter, referred to as new file) format of a computer file format, and the management information is added to each new file. Consequently, for example, the program name of the new file, information on the compression format when the stream is compressed data, and the date and time of formation of the stream can be extracted, so that index formation and retrieval of the recorded new files are easily enabled.

While the management information is added to each new file in the second embodiment, in addition to or instead of adding to each new file, the management information can be managed: by collectively recording the management information in another recording area, for example, in another storage recording medium in the computer.

Moreover, file name assignment to each new file can be performed by use of the management information.

(Third Embodiment)

Figure 7:
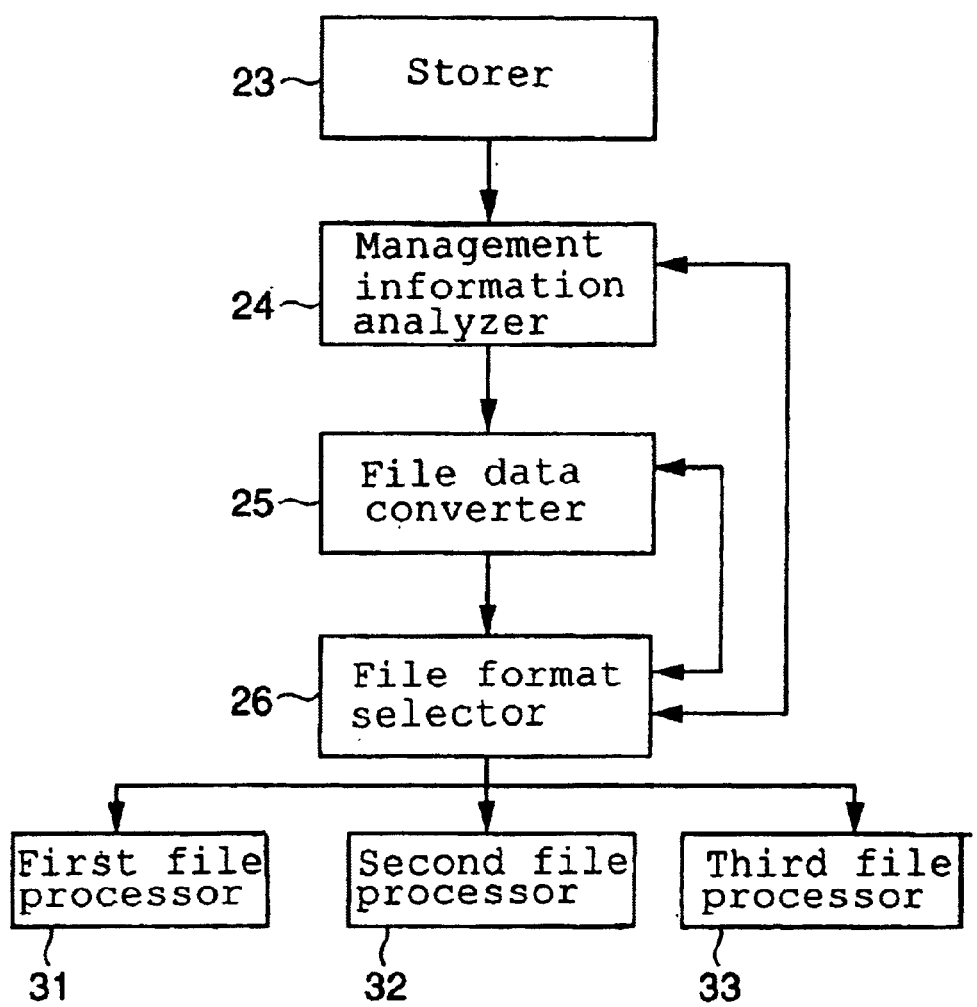
FIG. 7 is a block diagram of the structure of an apparatus for a third embodiment of the present invention.

FIG. 7 is a block diagram of a system showing a data processing method according to a third embodiment of the present invention. In FIG. 3, reference numeral 23 represents a storer, reference numeral 24 represents a management information analyzer, reference numeral 25 represents a file data converter, reference numeral 26 represents a file format selector, reference numeral 31 represents a first file processor, reference numeral 32 represents a second file processor, and reference numeral 33 represents a third file processor.

The operation of the system of the data processing method structured as described above will be described below.

Files formed in a similar manner to those in the second embodiment are recorded in the storer 23. That is, new files formed by cutting input data input in the stream-format into the computer file format and to which the management information is added are recorded in the storer 23. The new files in the storer 23 are input to the management information analyzer 24, and separated into the management information added to each file and real data other than the management information.

The file format selector 26 has information on the file processing methods of the file processors 31, 32 and 33 connected thereto. In FIG. 7, the first file processor 31 for processing files by a first file processing method, the second file processor 32 for processing files by a second file processing method and the third file processing method for processing files by a third file processing method are connected to the file format selector 26. The file format selector 26 informs the management information analyzer 24 that files whose processable file formats are first, second and third formats (hereinafter, referred to as first file format, second file format and third file format, respectively) can be processed.

The management information analyzer 24 determines whether the processing method of the new file is a processable processing method or not. When the new file is of a processable file format, the real data portion of the new file is directly transmitted from the management information analyzer 24 to the file format selector 26, and the direct management information analyzer 24 transmits the file format of the real data portion to the file format selector 26.

When the real data portion is of an unprocessable file format, the real data portion of the new file is input to the file data converter 25. The file data converter 25 converts the unprocessable real data portion of the new file into a processable real data portion, and transmits it to the file format selector 26. In addition, the file data converter 25 transmits the converted processing format to the file format selector 26.

The file format selector 26 transmits the real data portion to the first file processor 31, the second file processor 32 or the third file processor 33 in accordance with the transmitted processing format of the real data portion. The first file processor 31, the second file processor 32 or the third file processor 33 performs processing such as decompression of compressed data.

According to the third embodiment, it can be determined whether succeeding file processing can be performed on the recorded new file or not.

While in the third embodiment, the file data converter 24 performs data conversion on an unprocessable new file and then, succeeding processing is performed, it is possible that an unprocessable file is not processed. That is, when a file is determined to be unprocessable by the management information analyzer 24, succeeding processing is not performed and the user is informed that no applicable processor is mounted.

Embodiments in a case where data from an external input is formed into a file in a computer have been described. Subsequently, a case will be described in which data on a recording medium such as tape is formed into a file.

(Fourth Embodiment)

Figure 8:
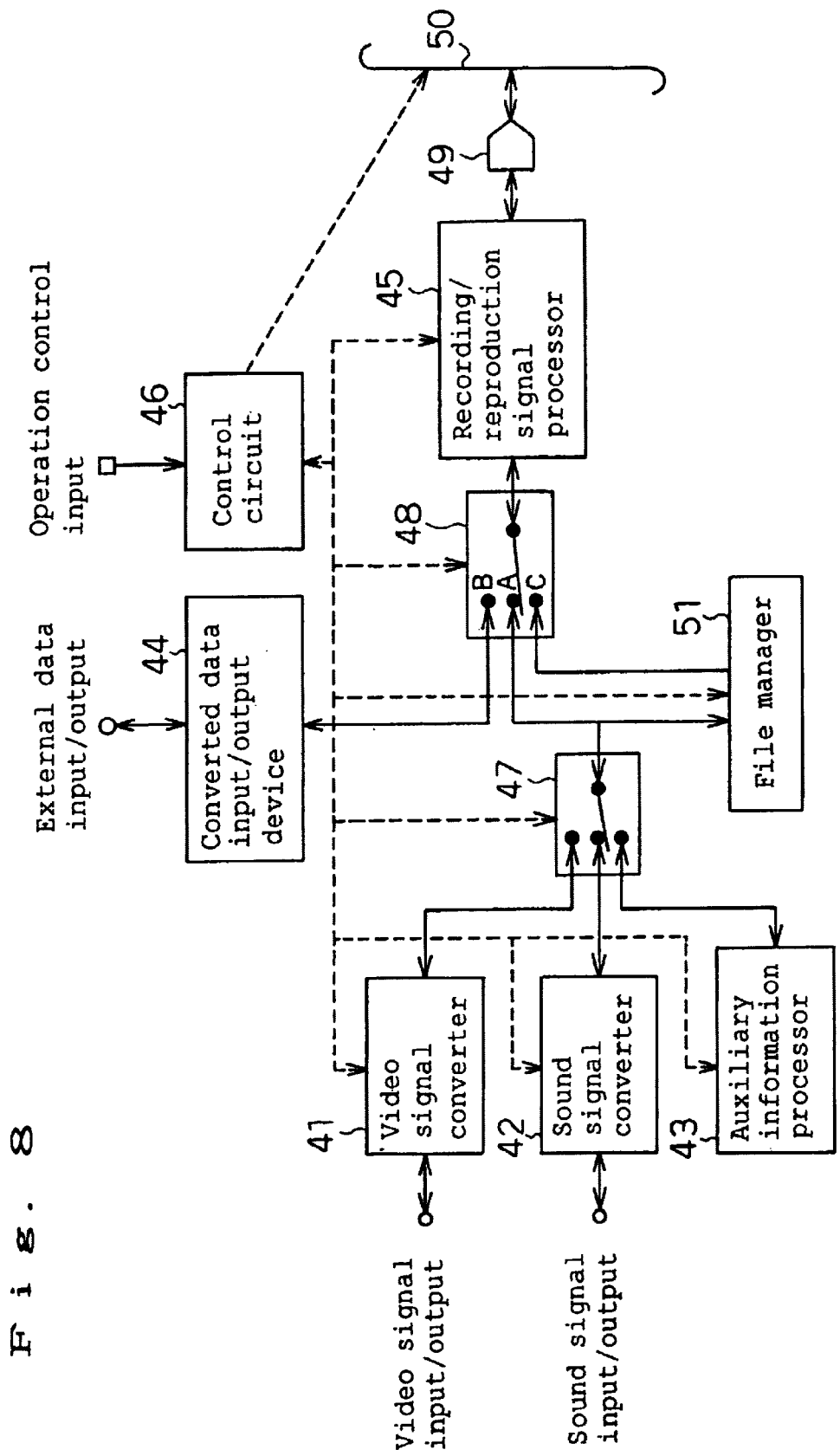
FIG. 8 is a block diagram of a data recorder according to a fourth embodiment.

FIG. 8 is a block diagram showing a data recorder according to a fourth embodiment of the present invention. Reference numeral 41 represents a video signal converter. Reference numeral 42 represents a sound signal converter. Reference numeral 43 represents an auxiliary information, processor. Reference numeral 44 represents a converted data input/output device. Reference numeral 45 represents a recording/reproduction signal processor. Reference numeral 46 represents a control circuit. Reference numeral 47 represents a first selector. Reference numeral 48 represents a second selector. Reference numeral 49 represents: a head. Reference numeral 50 represents a recording medium. Reference numeral 51 represents a file manager.

First, the video signal converter 41 performs predetermined conversion on the input video signal, and simultaneously therewith, the sound signal converter 42 performs predetermined conversion on the input sound signal. In accordance with an instruction input to the control circuit 46, the auxiliary information processor 43 generates predetermined auxiliary information, the second selector 48 is connected to the A side, the recording/reproduction signal processor 45 formats the input converted video signal, sound signal and auxiliary information into a recording signal while the first selector 47 is switched, and the head 49 records it onto the recording medium 50. Moreover, a video signal of the same format as that of the signal on which the predetermined conversion performed by the video signal converter 41 is performed, a sound signal of the same format as that of the signal on which the predetermined conversion performed by the sound signal converter 42 is performed, and the auxiliary information are input to the converted data input/output device 44, the second selector 48 is connected to the B side, the recording/reproduction signal processor 45 formats the converted video signal, sound signal and auxiliary information input from the converted data input/output device 44 into a recording signal, and the head 49 records it onto the recording medium 50. Instructions such as recording, reproduction, search and stop are input to the control circuit 46, and the control circuit 46 controls the entire apparatus as well as provides instructions to set processing of the video signal and the sound signal and to generate auxiliary information.

The recording/reproduction signal processor 45 processes signals reproduced from the recording medium 50 by the head 49, and inputs data to the video signal converter 41, the sound signal converter 42 and the auxiliary information processor 43 through the second selector 48 and the first selector 47. The video signal converter 41, the sound signal converter 42 and the auxiliary information processor 43 inversely convert the video signal, the sound signal and the auxiliary information to reproduce and output the original data. At this time, the second selector 48 outputs the input signal to the video signal converter 41, the sound signal converter 42 and the auxiliary information processor 43 and simultaneously therewith, outputs all to the converted data input/output device 44. The converted data input/output device 44 can output this signal outside from the second selector 48.

The signal output to the converted data input/output device 44 is also input to the file manager 51 at the same time. The file manager 51 divides a recorded signal into parts and generates individual file information for each part of the signal to form files. Moreover, the file manager 51 generates entire file information associated with the entire recording medium, and combines it with the individual file information into file information. The second selector 48 is switched to the C side. The recording/reproduction signal processor 45 formats the file information into a recording signal, and the recording signal is recorded onto the recording medium 50.

The converted data input/output device 44 can be designed so that it can transmit not only various signals but also instructions to be supplied to the data recorder.

An example of a condition of a recording medium where file information generated from data reproduced from a recording medium is recorded is shown in FIG. 9. Moreover, a head search flag exclusively used for file information is simultaneously recorded at the point of time when the recording of the file information is started. The head search flag may be approximate information that can be reproduced also in a high speed search, may be information representative of one point that can be reproduced only at the time of normal reproduction or may be both. The file information is recorded while a time code representative of the recording date and time is provided every predetermined unit of video signal. Here, the time code is in minutes. Although the time code may be in seconds, it is generally in units of a frame/field.

An example of the generated individual file information/entire file information is shown in FIG. 10. In FIG. 10, no problem arises if the cassette ID and the cassette label are not set because they are information for identifying the cassette.

The file information recorded position is the position where the recording of the file information is started. Although the file information recorded position is represented by the time code here, when numbers (although it is desirable that these numbers be continuous, there can be an error) representative of physical positions from the head of the recording medium are added, the numbers can be used.

It is necessary for the number of recorded files only to be information that makes it clear how much individual information there is. For example, when the size of the entire file information is known, it is possible to count the files by the file manager 51. When only additional recording is performed, the additional recording can be handled by providing, as a deleting operation, individual file information with a mark representing that the file information cannot be referred to although data is actually present on the recording medium. At such a time, the recorder can be structured so that as the item of the number of recorded files, either the number of files that can be referred to from outside or the number of actually recorded files, or both of them can be used.

It is unnecessary to set the tape length. However, by setting it, when a file is recorded from outside later, it can easily be performed by the file manager 51 to confirm whether the recording capacity is sufficient or not by checking the size of the file.

While it is also unnecessary to set the log information, it is an area where what processing was performed/what trouble was caused can be recorded.

The name, the file size and the recording start position are necessary for each file. The file manager 51 generates the name based on the time code. While the date is used as the directory name and the time is used as the file name in this example, an appropriate structure can be used.

As the recording start position, information where head search of these files can easily be performed is necessary. While the time code is used in this example, specification such as the number representative of the physical position from the head of the recording medium or the ordinal position of the head search flag from the head is possible.

While the file size is represented by time information in this example, no problem arises if it is represented by the number of bytes or the number of tracks.

It is unnecessary to set the recorded data type when the number of data types is one. However, when the number of formats of the recorded data is more than one, the contents cannot be confirmed unless the data format can be identified.

By recording such file information, the recorded data can be managed being formed into files, and when the cassette is once taken out and then, set again for reproduction, the contents recorded on the recording medium can easily be confirmed. Moreover, processing such as dubbing, edits, deletion and division of the recorded data can easily be performed by providing an instruction for each file.

(Fifth Embodiment)

Figure 11:
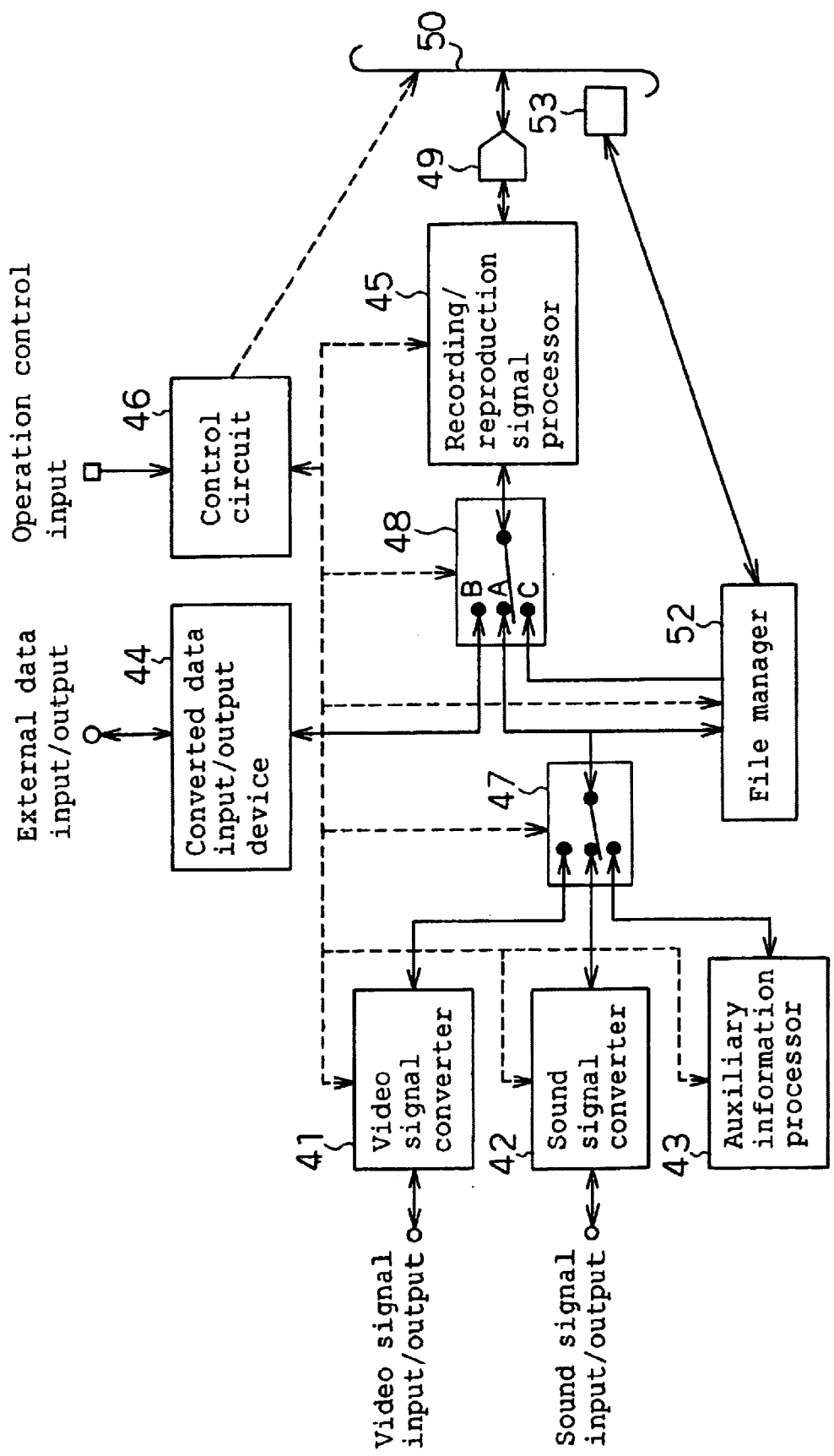
FIG. 11 is a block diagram of a data recorder according to a fifth embodiment.

FIG. 11 is a block diagram showing a data recorder according to a fifth embodiment of the present invention. The video signal converter 41, the sound signal converter 42, the auxiliary information processor 43, the converted data input/output device 44, the recording/reproduction signal processor 45, the control circuit 46, the first selector 47, the second selector 48, the head 49 and the recording medium 50 are the same as those of the fourth embodiment. Reference numeral 52 represents a file manager and the reference numeral 53 represents an auxiliary recording medium. The auxiliary recording medium 53 is attached to a case housing the recording medium 50.

Operations such as recording and reproduction are the same as those of the first embodiment. When file information is recorded onto the recording medium 50, the same contents are recorded onto the auxiliary recording medium 53.

By recording file information on the auxiliary recording medium 53 as mentioned above, it is unnecessary to search for the file information on the recording medium (tape) 50 when the cassette is once taken out and then, set again for reproduction, the contents of the cassette can quickly be confirmed.

Figure 12:
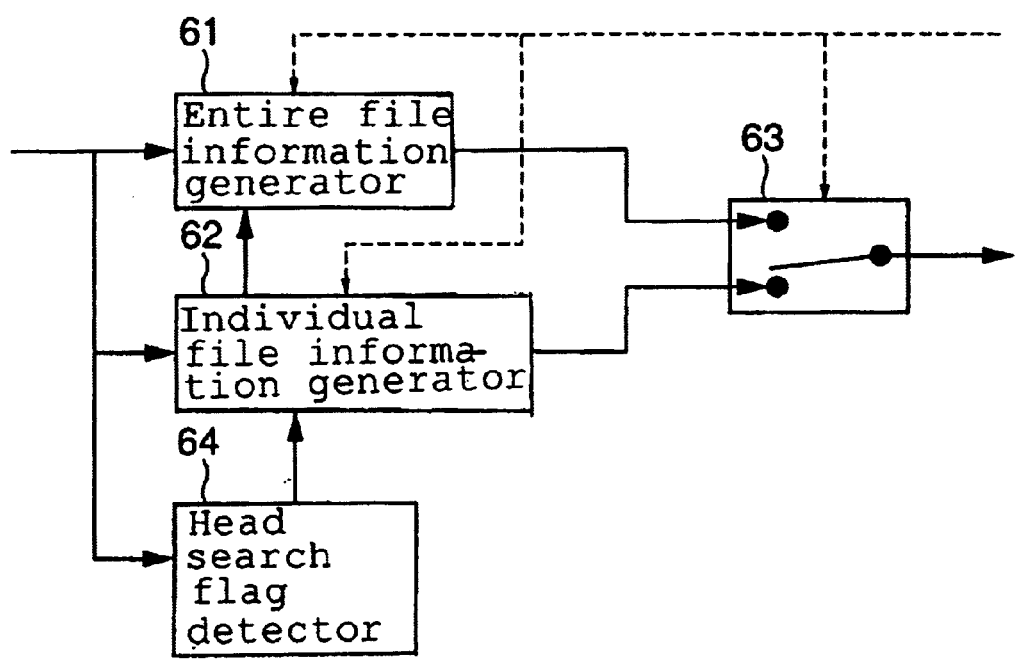
FIG. 12 is a block diagram of an example of the structure of a file manager 41 or 42.

FIG. 12 is a block diagram of an example of the structure of the file manager 51 or 52. Reference numeral 61 represents an entire file information generator. Reference numeral 62 represents individual file information generator. Reference numeral 63 represents a file information selector. Reference numeral 64 represents a head search flag detector.

First, the head search flag detector 64 extracts the part where the head search flag is stored from the input data, and determines whether the head search flag is on or not. When the head search flag is on, the head search flag detector 64 outputs a signal providing an instruction to divide the recorded data to the individual file information generator 62. Based on the information, the individual file information generator 62 divides the recorded data, generates predetermined file information, and outputs file number information to the entire file information generator 61. The entire file information generator 61 generates predetermined information such as file number information, and detects the current last data to decide the file information recording start position. The file information selector 63 makes a selection between the entire file information and the individual file information and outputs the selected one when the data recorder is controlled to be in a condition for recording file information.

Moreover, the individual information generator 62 can select an appropriate frame and add it to the file information. As the appropriate frame, for example, the first frame or a frame that is specified by an external input 1 while reproduction is being performed can be used.

By generating file information in this manner, recorded data can be managed being formed into files, so that various processing scan easily be performed. Moreover, when data on a frame is used as the file information, the contents of the data can be confirmed as an image, so that confirmation is facilitated.

Figure 13A:
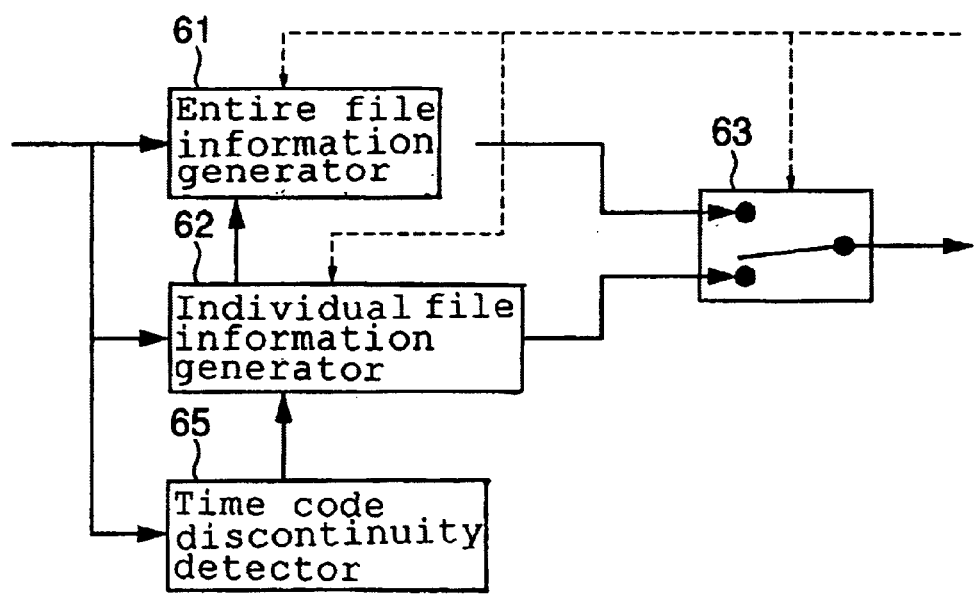
FIG. 13 is a block diagram of another example of the structure of the file manager 41 or 42.
Figure 13B:
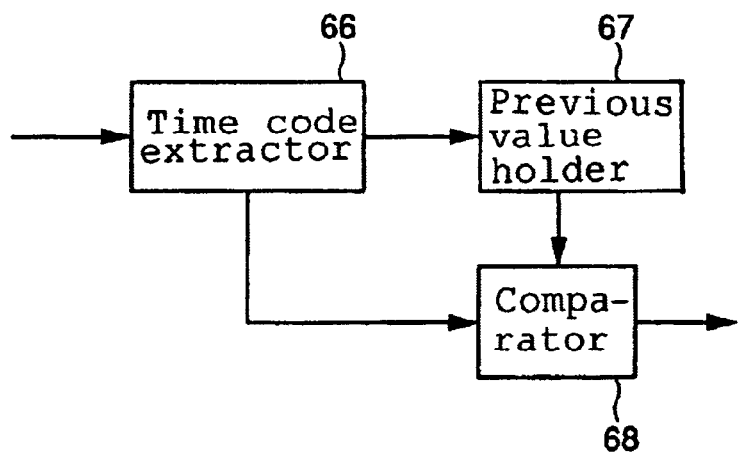

FIG. 13 is a block diagram of another example of the structure of the file manager 51 or 52. The entire file information generator 61, the individual file information generator 62 and the file information selector 63 are the same as those of FIG. 12. Reference numeral 65 represents a time code discontinuity detector. (b) of FIG. 13 shows a block structure of the time code discontinuity device 65. Reference numeral 66 represents a time code extractor. Reference numeral 67 represents a previous value holder. Reference numeral 68 represents a comparator.

The entire file information generator 61, the individual file information generator 62 and the file information selector 63 perform the same operations as those of FIG. 12. The time code discontinuity detector 65, first, extracts the part where the time code is stored from the input data with the time code extractor 66, and shifts a value of one unit time ago to the previous value holder 67. The value of one unit time ago and the current input value are compared by the comparator 68. When the continuity of the time code is not maintained, a signal providing an instruction to divide the recorded data is output to the individual information generator 62.

By generating file information in this manner, recorded data can be managed being formed into files, so that various-processings can easily be performed like in the example of FIG. 12. Moreover, it is possible to perform the detection with higher precision by combining the example of FIG. 12 and the example of FIG. 13.

While in the above-described embodiment, it has been described that various effects are obtained by introducing the file manager shown in FIG. 12 or 13 to the conventional data recorder, when additional recording is performed by the conventional data recorder on the recording medium where recording is performed in the above-described embodiment, invalid data is recorded on the file information, so that there is a possibility that a trouble is caused such that the file information is partly deleted by being overwritten. Measures to prevent this will subsequently be described.

(Sixth Embodiment)

Figure 14:
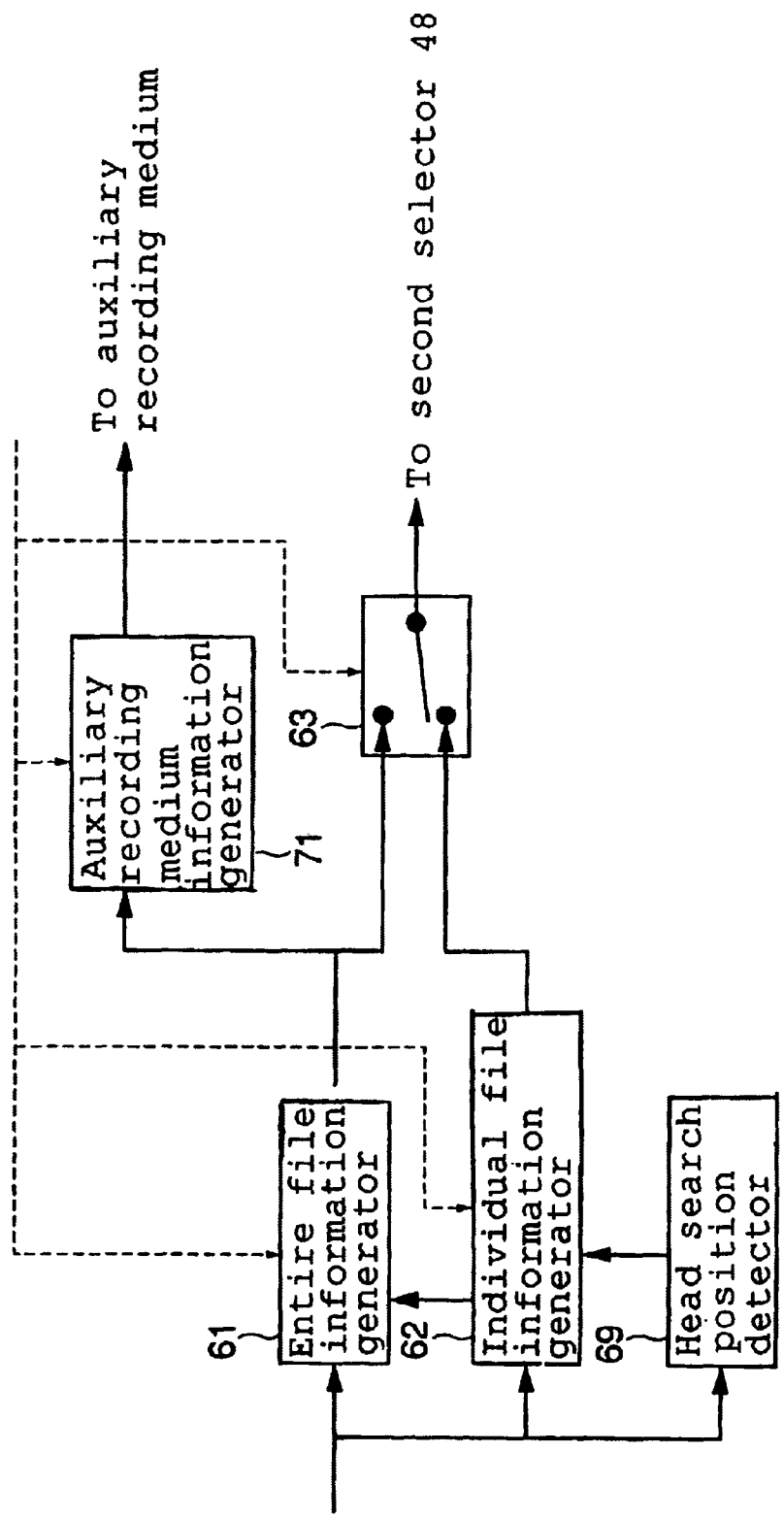
FIG. 14 is a block diagram of another example of the structure of the file manager 42 according to a sixth embodiment.

FIG. 14 is a block diagram of another example of the structure of the file manager 52. The entire file information generator 61, the individual file information generator 62 and the file information selector 63 are the same as those of FIG. 13. A head search position detector designated 69 is a block having a function as described in the example of FIG. 12 or FIG. 13. Reference numeral 71 represents an auxiliary recording medium information generator.

The auxiliary recording medium information generator 71 manages an area where file information is recorded by use of auxiliary information prepared in the conventional data recorder.

Of information prepared as auxiliary information, information representative of the end position of a program (title end) and information representative of the structure of the recorded program (chapter) can be used.

First, as shown in FIG. 15, when the title end is set to a value specifying a position immediately before the file information, the conventional data recorder does not recognize the file information and deletes all the file information. Although it is necessary to form the data into files and re-generate file information, no trouble is caused.

Subsequently, as shown in FIG. 16, when the file information is repetitively recorded twice and the title end is set td a value specifying a position immediately before the second file information, the conventional data recorder does not recognize the second file information and deletes it all. In the data recorder of the present invention, even for a recording medium brought to such a state, it can be recognized that the recording medium is in an abnormal state because both of the two pieces of file information are not present, and file reconstruction can be performed without any problem for earlier data because one piece of file information is left. Earlier file information can be invalidated by resetting the head search flag exclusively used for file information.

Subsequently, as shown in FIG. 17, when the title end is set to a value specifying the position where the file information is ended and the data and the file information are set as different chapters, the conventional data recorder leaves the file information in its complete form. In the data recorder of the present invention, even for a recording medium brought to such a state, it can be judged that the recording medium is in an abnormal state from the position of the title end and the structure of the chapter, and file reconstruction can be performed without any problem for earlier data because the file information is left. Earlier file information can be invalidated by resetting the head search flag exclusively used for file information.

With the above-described structure, the data recorder of the present invention is compatible with the conventional data recorder.

The items of the entire file information and the individual information are an example, and the present invention is also applicable when different information is used.

While the file manager is incorporated in the data recorder in the above-described embodiment, the present invention can also be realized by obtaining data that is output through the converted data input/output device outside, generating file information and recording the file information through the converted data input/output device. That is, by realizing the present invention as a program for a computer or a microcomputer and recording this on a recording medium such as a floppy disk for conveyance, the present invention can easily be carried out in another individual system.

Subsequently, a method of actual recording onto tape will be described.

(Seventh Embodiment)

Figure 18:
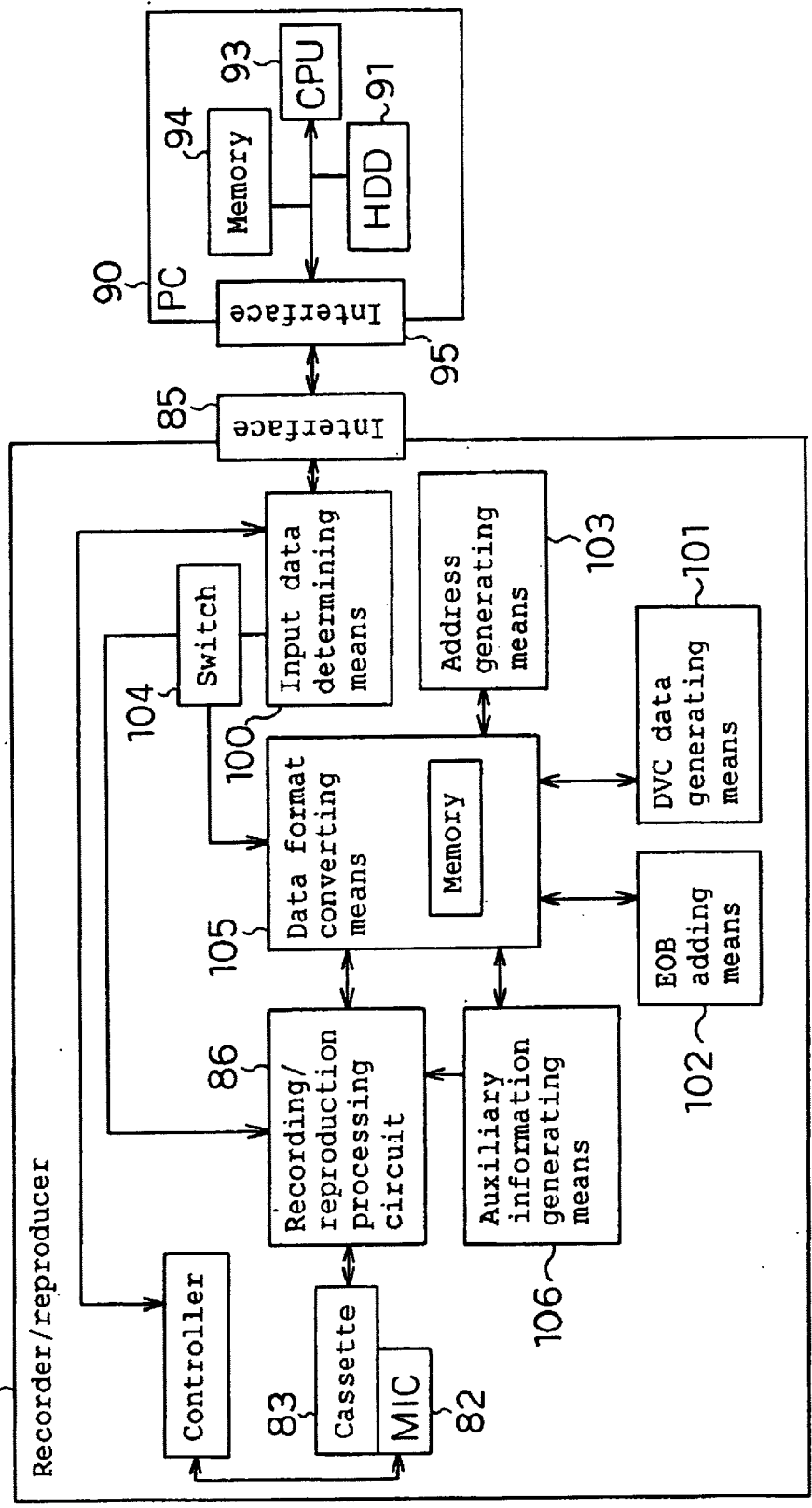
FIG. 18 is a block diagram of the structure of an apparatus for realizing a data recording method according to a seventh embodiment.

FIG. 18 is a block diagram of a recorder/reproducer according to a seventh embodiment of the present invention. In FIG. 18, reference numeral 81 represents a recorder/reproducer, reference numeral 83 represents a cassette, reference numeral 82 represents an MIC, reference numeral 86 represents a recording/reproduction processing circuit, reference numeral 90 represents a personal computer (PC), reference numeral 91 represents a hard disk (HDD), reference numeral 93 represents a CPU, reference numeral 94 represents a memory, reference numerals 85 and 95 represent interfaces, reference numeral 100 represents input data determining means, reference numeral 101 represents DVC data generating means, reference numeral 102 represents EOB adding means, reference numeral 103 represents address generating means, reference numeral 104 represents a switch, reference numeral 105 represents data format converting means, and reference numeral 106 represents auxiliary information generating means.

Hereinafter, the elements denoted by the same reference numerals have the same structures and functions.

The operation of the recorder/reproducer structured as described above will be described below.

In this embodiment, a case will be shown in which data files stored in the hard disk in the PC are transferred to the recorder/reproducer and recorded thereonto.

The input data determining means 100 determines whether the data input from the hard disk 91 of the PC 90 is DVC data or not.

Figure 19A:
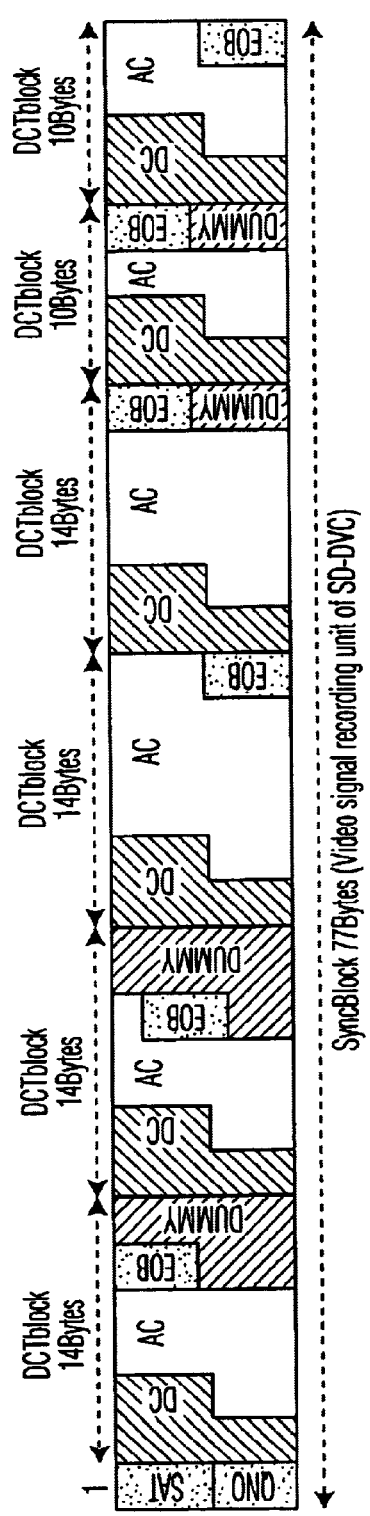
FIG. 19 is a view for realizing a method of recording data onto a digital VCR.
Figure 19B:
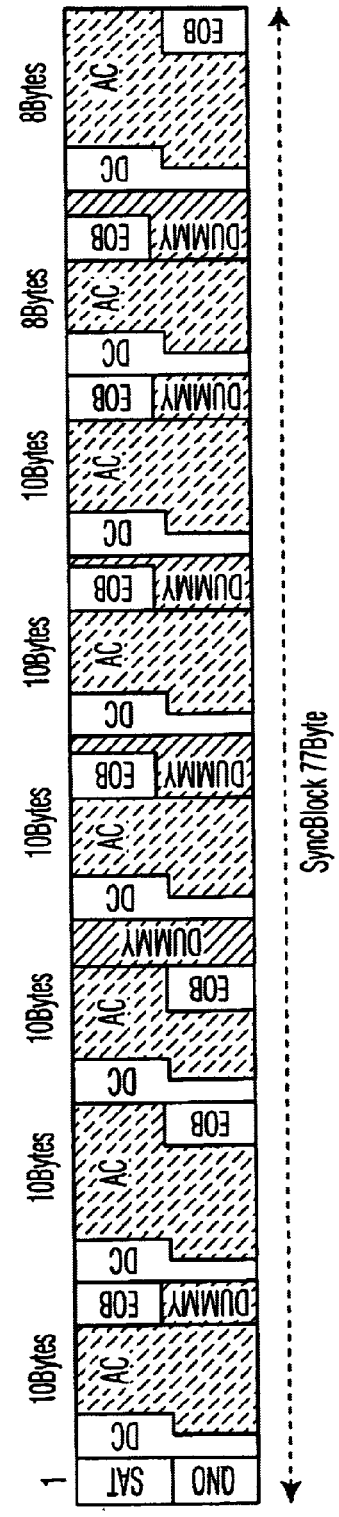

The determination is performed by use of whether the data name extension and the management information added to the data coincide with predetermined values or not. In doing this the condition of the data to be output, for example, whether the data is compliant with the 25-Mbps-mode of the DVC standard or the low-rate 12.5-Mbps is also determined by the input data determining means 100. When it is determined as a result of the determination that the input data is DVC data, the input data is output to the recording/reproduction processing circuit 86 as it is by the switch 104. In this case, the data is recorded in a DVC packet format as shown in FIG. 19. Here, a video packet is shown. In the packet, six small blocks of DCT (discrete cosine transformation) code data is stored. A direct current component thereof is disposed in a fixed position as shown in (a) of FIG. 19, or is disposed in a fixed position as shown in (b) of FIG. 19 in the case of data compliant with the low-rate 12.5-Mbps mode.

When the input is other than DVC data, the input data is switched by the switch 104 and input to the data format converting means 105.

The DVC data generating means 101 connected to the data format converting-means 105 outputs the data pattern of each packet provided on the memory in a prescribed order. In doing this, successively changing values such as the track number of the currently output data and the number of each packet are output after successively rewritten by a counter. Moreover, when the input data is of a format other than the DVC data format, whether the input data is to be recorded in compliance with the 25-Mbps mode or to be recorded in compliance with the low-rate 12.5-Mbps mode is also determined by use of the input data determining means 100 based on the data rate, etc., and in accordance with the determination, the header of the packets and a value in a specific packet are changed to appropriate ones.

The address generating means 103 generates an address to which data of each packet can be assigned.

Figure 20A:
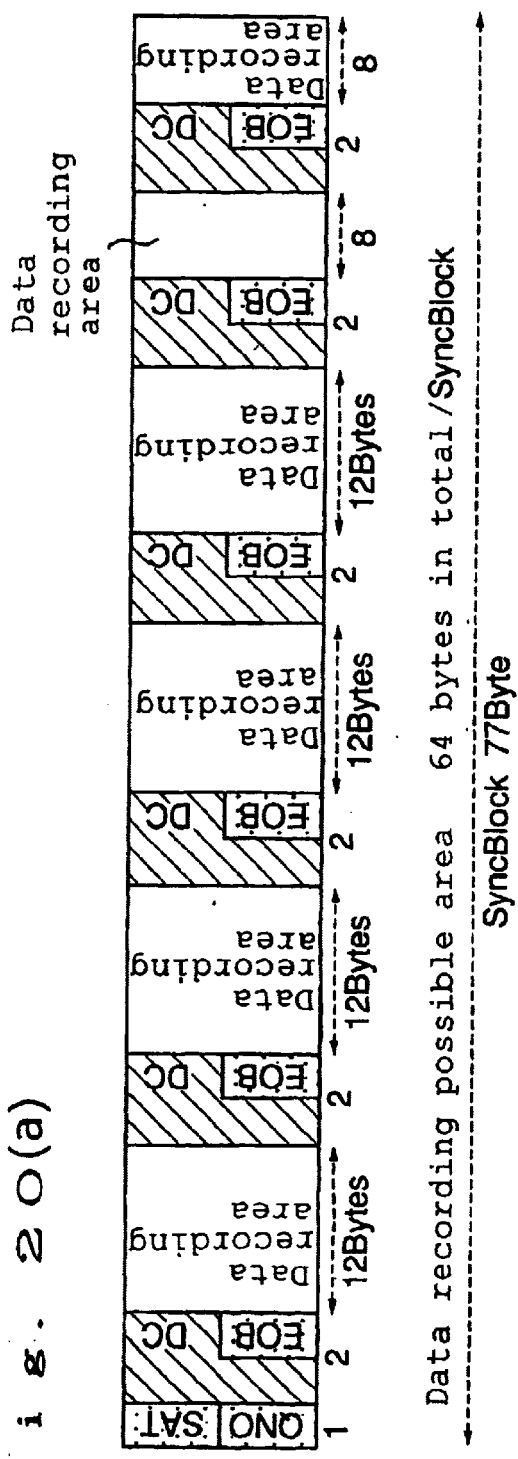
FIG. 20 is a view for realizing a method of recording data onto a digital VCR of another format.
Figure 20B:
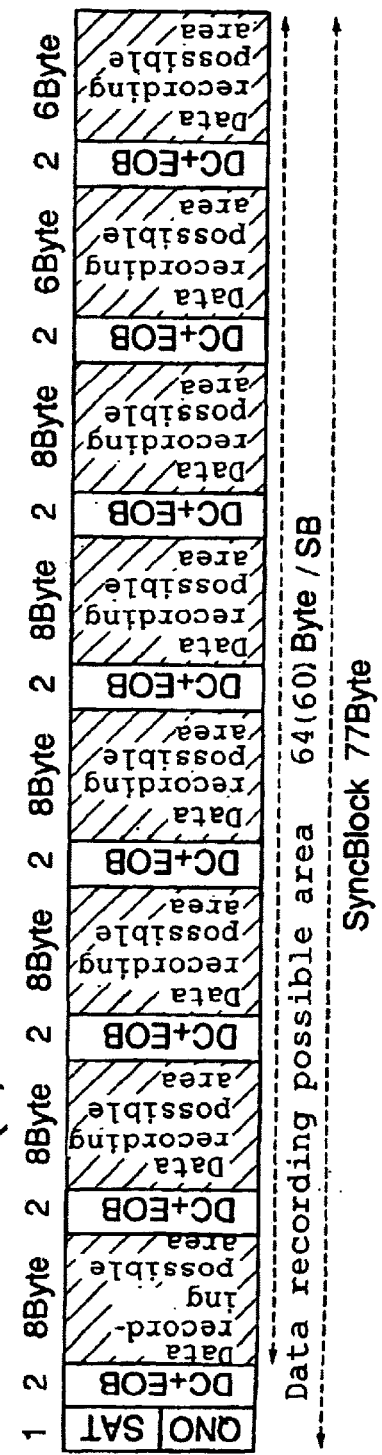

(a) of FIG. 20 shows a method of recording data other than DVC data in video packets of the DVC packets of the 25-Mbps mode.

Like in (a) of FIG. 19, six small blocks of DCT (discrete cosine transformation) code data is stored in the packet and a direct current component thereof is disposed in a fixed position as shown in the figure. The EOB adding means 102 generates an EOB (end of block) code representing that the codeword of the small block is discontinued here, and adds the EOB code at an address generated by the address generating means 103, that is, an address immediately behind the moving component, the class information and the direct current component of each small block. By this operation, an area of 12 bytes or 8 bytes from the EOB to the start position of the next small block, 64 bytes in total for one DVC block, is a data area invalid for decoding and reproduction of existing DVC data, so that DVC-reproduced images are not affected by assignment of any data to this area and a composite image of only the data of the direct current component is displayed.

(b) of FIG. 20 shows a method of recording data other than DVC data in video packets of the DVC packets of the. 12.5-Mbps mode.

Like in (b) of FIG. 19, eight small blocks of DCT (discrete cosine transformation) code data is stored in the packet and a direct current component thereof is disposed in a fixed position as shown in the figure. The EOB adding means 102 generates an EOB (end of block) code representing that the codeword of the small block is discontinued here, and adds the EOB code at an address generated by the address generating means 103, that is, an address immediately behind the direct current component of each small block. Moreover, data is also recorded in the recording positions of the moving component and the class information that are unnecessary for recording of data other than DVC data. In doing so, since the block is determined to be invalid when the combination of the moving information, the class information and the direct current component is a special one, the data format conversion processing means 105 determines whether the pattern of bit combination of the input data and the direct current component coincides with the special pattern or not. When the pattern coincides with the special pattern, the ninth bit of the direct current component is converted.

By this operation, an area of 12 bytes or 8 bytes from the EOB to the start position of the next small block, in addition, 4 bits for each, 64 bytes in total for the DVC block like in (a) of FIG. 20, is a data area invalid for decoding and reproduction of existing DVC data, so that. DVC-reproduced images are not affected by assignment of any data to this area and a composite image of only the data of the direct current component is displayed.

The data on which the above-described conversion has been performed is recorded onto the cassette 83 by the recording/reproduction processing circuit 86.

The data can be written twice for enhancement of error durability. In this case, the data rate is ½.

(Eighth Embodiment)

Figure 21:
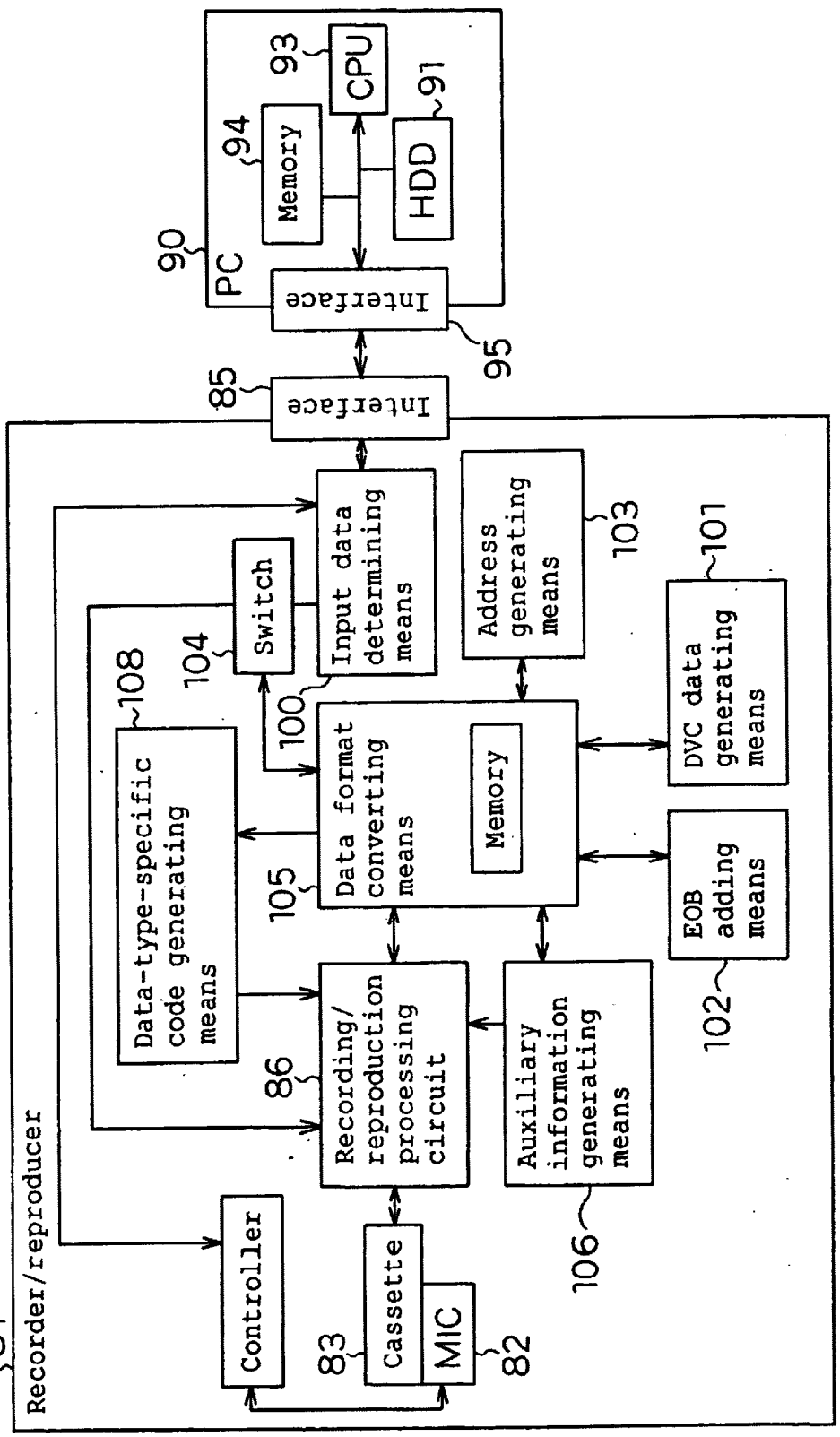
FIG. 21 is a block diagram of the structure of an apparatus for realizing a data recording method according to an eighth embodiment.

FIG. 21 is a block diagram of a recorder/reproducer according to an eighth embodiment of the present invention. In FIG. 21, reference numeral 108 represents data-type-specific code generating means.

The operation of the recorder/reproducer structured as described above will be described below.

In this embodiment, like in the seventh embodiment, a case will be shown in which data files stored in the hard disk in the PC are transferred to the recorder/reproducer and recorded thereonto. The blocks denoted by the same reference numerals as those of the seventh embodiment have the same functions.

Based on the input from the input data determining means 100, the data-type-specific code generating means 108 generates a flag representative of whether the recorded-data is DVC data recorded as it is or not and a flag representative of whether recording is performed in the 25-Mbps mode or in the 12.5-Mbps mode, and adds the flags to the input data. When the cassette 83 has the MIC 82 which is an external storage device, these flags are also recorded therein.

The data on which the above-described conversion has been performed is recorded from the recording/reproduction processing circuit 86 onto the cassette 83.

By the above-described operation, by providing both a recording function of the existing digital VTR deck and a function of recording of data other than digital VTR data, switching between these functions and simultaneously therewith, recording in which format recording is performed together with the data, both data files and existing digital VTR data can be recorded without any problem.

The data can be written twice for enhancement of error durability. In this case, the data rate is ½.

(Ninth Embodiment)

Figure 22:
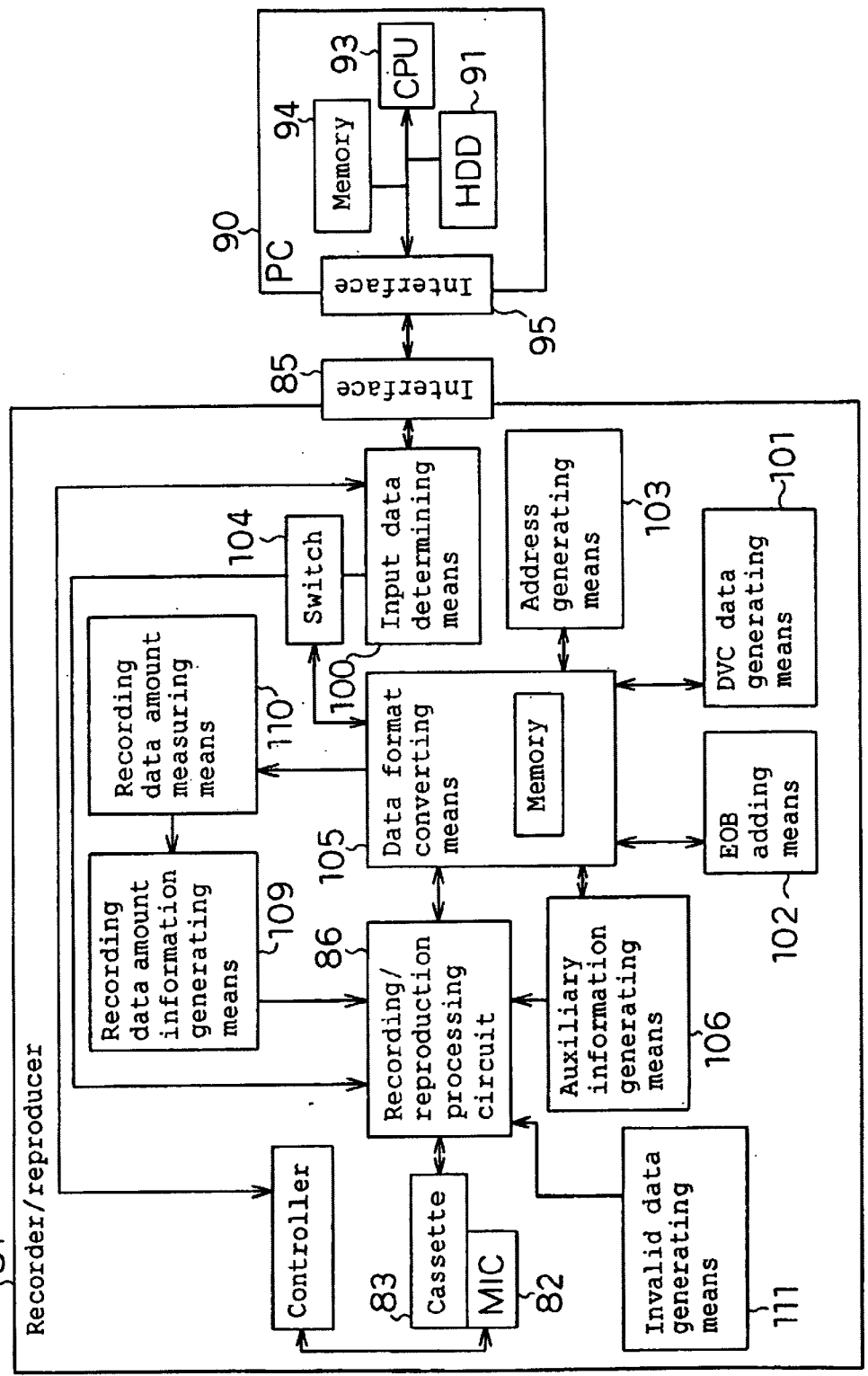
FIG. 22 is a block diagram of the structure of an apparatus for realizing a data recording method according to a ninth embodiment.

FIG. 22 is a block diagram of a recorder/reproducer according to a ninth embodiment of the present invention. In FIG. 22, reference numeral 109 represents recording data amount information generating means, reference numeral 111 represents invalid data generating means, and reference numeral 110 represents recording data amount measuring means.

The operation of the recorder/reproducer structured as described above will be described below.

In this embodiment, like in the seventh embodiment, a case will be shown in which data files stored in the hard disk in the PC are transferred to the recorder/reproducer and recorded thereonto. The blocks denoted by the same reference numerals as those of the seventh embodiment have the same functions.

Figure 23:
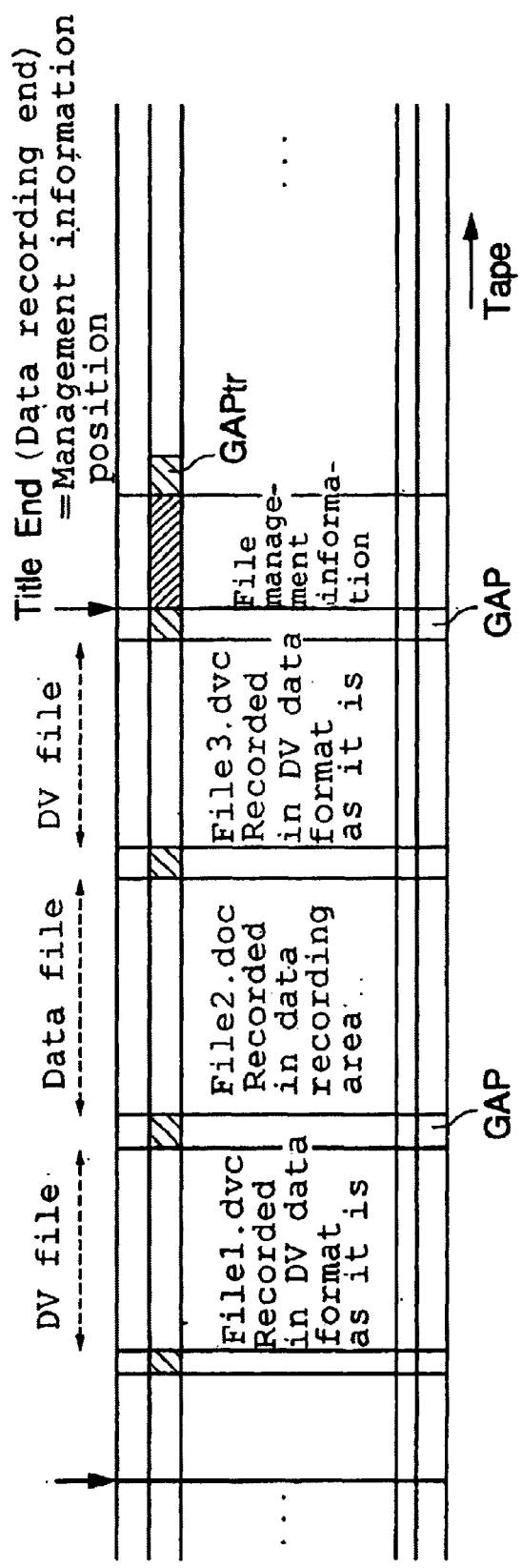
FIG. 23 is a view explaining a method of recording onto tape.

Data is recorded onto the tape in a format as shown in FIG. 23. In DVC, since the data rate of recording onto tape is constant, when the data rate of input from the PC is variable, it is necessary to record data after adding invalid data thereto so that the recording data is constant. The amount of data input in $1/299.7$ second corresponding to one track is measured by the recording data amount measuring means 110. Invalid data of an amount corresponding to the difference from the recording data amount, 64 bytes×128=2 Kbytes in this case, is generated by the invalid data generating means 111 and added to the input data, and then, recording is performed. Further, the measurement amount of the recording data amount measuring means 110 is generated as a flag by the recording data amount information generating means 109, and the flag is recorded being multiplexed in the input signal. When the cassette 83 has the MIC 82 which is an external storage device, this flag is also recorded therein.

According to the above-described embodiment, when the size of the input data file is not an integral multiple of the size of a data recording possible area, that is, a data area invalid for decoding and reproduction of the existing digital VTR, or when the recording rate of the existing deck and the input data rate are different although conversion and recording are tried with real-time property being maintained, it is possible to record data after adding invalid dummy data thereto and reproduce the data file after removing the added invalid dummy data at the time of reproduction.

The data can be written twice for enhancement of error durability. In this case, the data rate is ½ at worst although it varies according to the amount of invalid dummy data.

(Tenth Embodiment)

Figure 24:
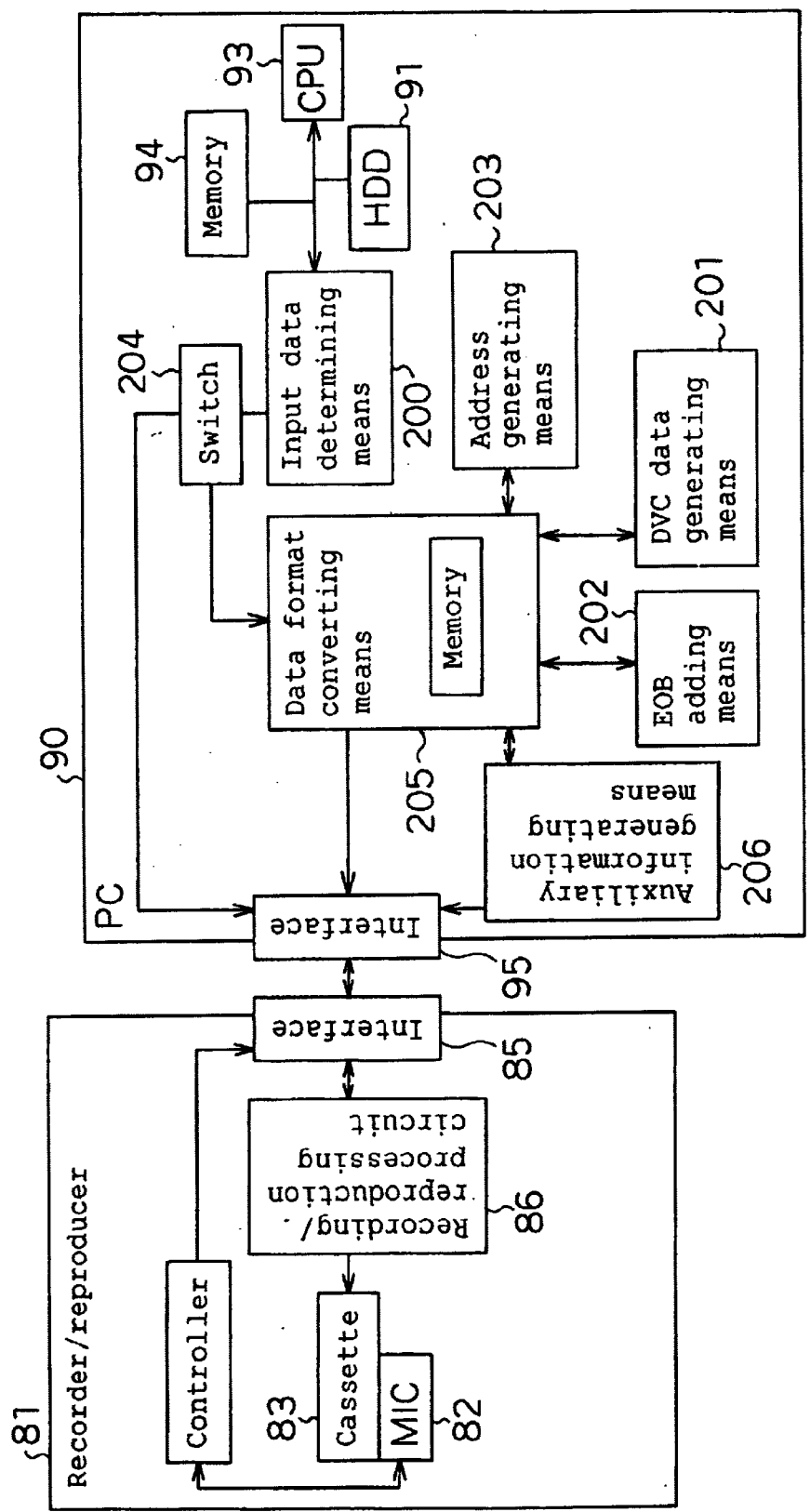
FIG. 24 is a block diagram of the structure of an apparatus for realizing a data recording method according to a tenth embodiment.

FIG. 24 is a block diagram of a recorder/reproducer according to a tenth embodiment of the present invention. In FIG. 24, reference numeral 200 represents input data determining means, reference numeral 201 represents DVC data generating means, reference numeral 202 represents EOB adding means, reference numeral 203 represents address generating means, reference numeral 204 represents a switch, reference numeral 205 represents data format converting means, and reference numeral 206 represents auxiliary information generating means.

The operation of the PC structured as described above and the recorder/reproducer connected to the PC will be described below.

In this embodiment, a case will be described in which data files stored in the hard disk in the PC are transferred to the recorder/reproducer after converted in the PC, and recorded onto the recorder/reproducer. The blocks denoted by the same reference numerals as those of the seventh to the ninth embodiments have the same functions.

The input data determining means 200 determines whether the data input from the hard disk 91 of the PC 90 is DVC data or not.

When it is determined as a result of the determination that the input data is DVC data, the input data is output to the interface 95 as it is by the switch 204. In this case, the data is recorded in a DVC packet format as shown in FIG. 19.

When the input data is other than DVC data, the input data is switched by the switch 204 and input to the data format converting means 205 to be converted into the format shown in FIG. 20.

The DVC data generating means 201 connected to the data format converting means 205 outputs to a buffer the data pattern of each packet provided on the memory in a prescribed order. In doing this, successively changing values such as the track number of the currently output data and the number of each packet are output after successively rewritten by a counter. The address generating means 203 generates an address to which data of each packet can be assigned.

Like in the other embodiments, data other than DVC data is disposed in a DVC packet in the format of (a) of FIG. 20 in the 25-Mbps mode and in the format of (b) of FIG. 20 in the 12.5-Mbps mode.

The data on which the above-described conversion has been performed is output to the recorder/reproducer 81 and recorded onto the cassette by the recording/reproduction processing circuit 86.

By the above-described operation, by converting data into a data format compliant with the recording function of the existing digital VTR deck, data files can be-recorded with the existing digital VTR without any problem.

The data can be written twice for enhancement of error durability. In this case, the data rate is ½.

(Eleventh Embodiment)

Figure 25:
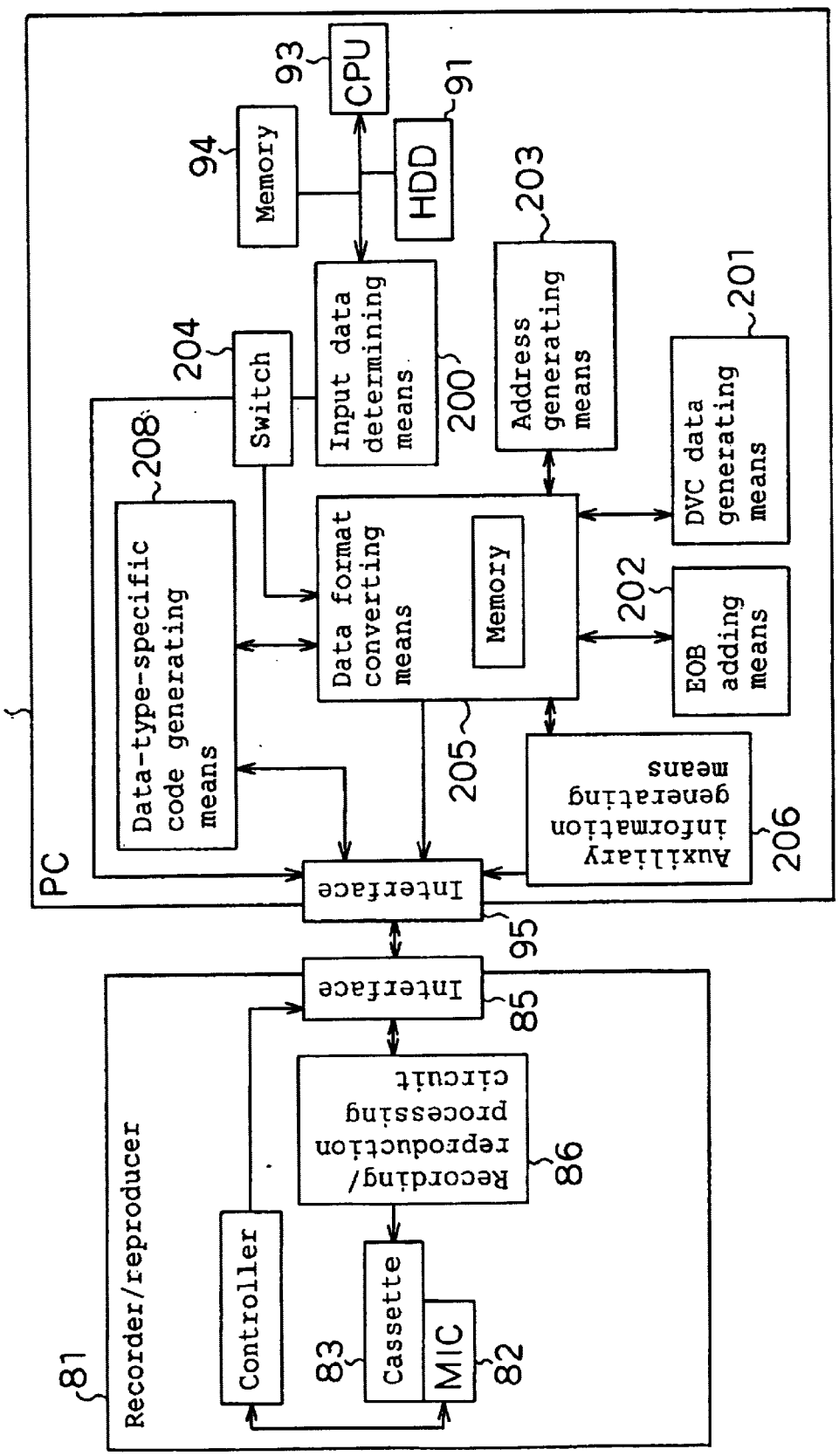
FIG. 25 is a block diagram of the structure of an apparatus for realizing a data recording method according to an eleventh embodiment.

FIG. 25 is a block diagram of a recorder/reproducer according to an eleventh embodiment of the present invention. In FIG. 25, reference numeral 200 represents input data determining means, reference numeral 201 represents DVC data generating means, reference numeral 202 represents EOB adding means, reference numeral 203 represents address generating-means, reference numeral 204 represents a switch, reference numeral 205 represents data format converting means, reference numeral 206 represents auxiliary information generating means, and reference numeral 208 represents data-type-specific code generating means.

The operation of the PC structured as described above and the recorder/reproducer connected to the PC will be described below.

In this embodiment, a case will be described in which data files stored in the hard disk in the PC are transferred to the recorder/reproducer after converted in the PC, and recorded onto the recorder/reproducer. The blocks denoted by the same reference numerals as those of the seventh to the tenth embodiments have the same functions.

The DVC data generating means 201 connected to the data format converting means 205 outputs to a buffer the data pattern of each packet provided on the memory in a prescribed order. In doing this, successively changing values such as the track number of the currently output data and the number of each packet are output after successively rewritten by a counter. The address generating means 203 generates an address to which data of each packet can be assigned.

Like in the other embodiments, data other than DVC data is disposed in a DVC packet in the format of (a) of FIG. 20 in the 25-Mbps mode and in the format of (b) of FIG. 20 in the 12.5-Mbps mode.

Based on the input from the input data determining means 200, the auxiliary information generating means 206 generates a flag representative of whether the disposed data is DVC data recorded as it is or not and a flag representative of whether recording is performed in the 25-Mbps mode or in the 12.5-Mbps mode, and adds the flags to the input data.

The data on which the above-described conversion has been performed is output to the recorder/reproducer 81 and recorded onto the cassette 83 by the recording/reproduction processing circuit 86.

By the above-described operation, by switching between digital VTR data and data other than the digital VTR data and converting the data into a data format compliant with the recording function of the existing digital VTR deck, both data files and data of the existing digital VTR can be recorded without any problem.

According to the above-described embodiment, by converting data files other than video signals and sound signals of a predetermined format and transmitting the converted data files by capitalizing on a characteristic that the position of the codeword of the direct current component which is the start position of each small block is fixed and when the end-of-block code is added, the area from there to the start position of the next small block becomes a data area invalid for decoding and reproduction of the existing digital VTR, recording can be performed with the existing digital VTR deck. Moreover, since the data on the recording medium is the same as the transmission and recording format of the recording medium and the data file portion is skipped as an invalid data area by the reproducer/decoder of the existing digital VTR deck, the tape on which data files are recorded can be viewed with the existing digital VTR deck without any problem.

The data can be written twice for enhancement of error durability. In this case, the data rate is ½ at worst although it varies according to the amount of invalid dummy data.

(Twelfth Embodiment)

Figure 26:
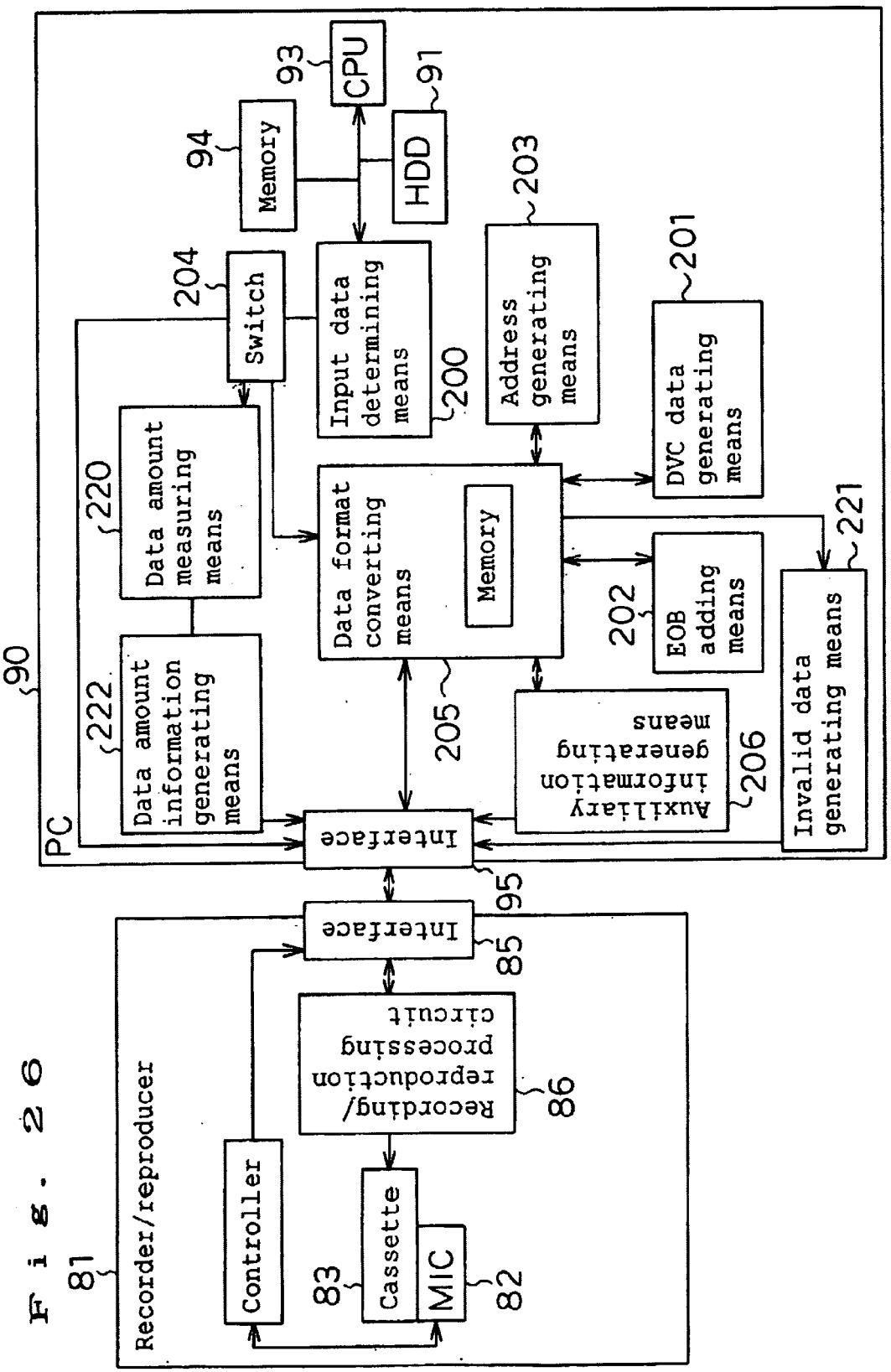
FIG. 26 is a block diagram of the structure of an apparatus for realizing a data recording method according to a twelfth embodiment.

FIG. 26 is a block diagram of a recorder/reproducer according to a twelfth embodiment of the present invention. In FIG. 26, reference numeral 220 represents data amount measuring means, reference numeral 221 represents invalid data generating means, and reference numeral 222 represents data amount information generating means.

The operation of the PC structured as described above and the recorder/reproducer connected to the PC will be described below.

In this embodiment, a case will be shown in which data is reproduced from the recorder/reproducer or transferred to the hard disk in the PC.

In this embodiment, a case will be shown in which data files stored in the hard disk in the PC are transferred to the recorder/reproducer and recorded thereonto. The blocks denoted by the same reference numerals as those of the seventh to the eleventh embodiments have the same functions.

The DVC data generating means 201 connected to the data format converting means 205 outputs to a buffer the data pattern of each packet provided on the memory in a prescribed order. In doing this, successively changing values such as the track number of the currently output data and the number of each packet are output after successively rewritten by a counter. The address generating means 203 generates an address to which data of each packet can be assigned.

Like in the seventh embodiment, data other than DVC data is disposed in a DVC packet in the format of (a) of FIG. 20 in the 25-Mbps mode and in the format of (b) of FIG. 20 in the 12.5-Mbps mode.

The data on which the above-described conversion has been performed is output to the recorder/reproducer 81 and recorded onto the cassette 83 by the recording/reproduction processing circuit 86. The data is recorded in a format as shown in FIG. 23. In DVC, since the data rate of recording onto tape is constant, when the data rate of input from the PC is variable, it is necessary to record data after adding invalid data thereto so that the recording data is constant. The amount of data input in $1/299.7$ second corresponding to one track is measured by the recording data amount measuring means 210. Invalid data of an amount corresponding to the difference from the recording data amount, 64 bytes×128=2 Kbytes in this case, is generated by the invalid data generating means 211 and added to the input data, and then, recording is performed. Further, the measurement amount of the data amount measuring means 220 is generated as a flag by the data amount information generating means 222, and the flag is recorded being multiplexed in the input signal.

According to the above-described embodiment, when the size of the input data file is not an integral multiple of the size of a data recording possible area, that is, a data area invalid for decoding and reproduction of the existing digital VTR, or when the recording rate of the existing deck and the input data rate are different although conversion and recording are tried with real-time property being maintained, it is possible to record data after adding invalid dummy data thereto and reproduce the data file after removing the added invalid dummy data at the time of reproduction.

While the data amount is the data amount in one track, a different unit such as ten tracks as the setting at the time of input may be used. Moreover, when the cassette has the MIC which is an external storage device, determination may be performed by use of information recorded therein.

(Thirteenth Embodiment)

Figure 27:
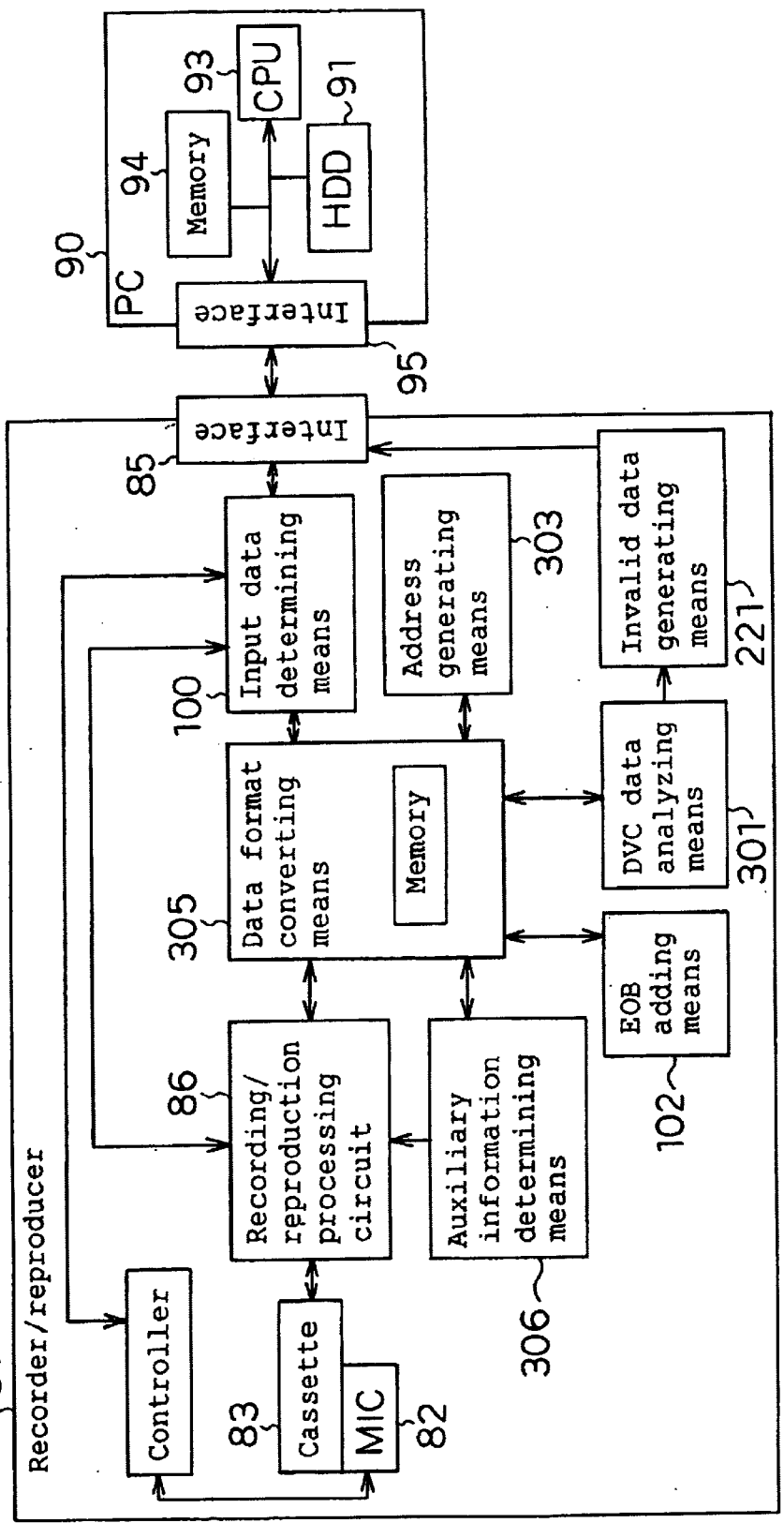
FIG. 27 is a block diagram of the structure of an apparatus for realizing a data recording method according to a thirteenth embodiment.

FIG. 27 is a block diagram of a recorder/reproducer according to a thirteenth embodiment of the present invention. In FIG. 27, reference numeral 301 represents DVC data analyzing means, reference numeral 303 represents address generating means, reference numeral 305 represents data format converting means, and reference numeral 306 represents auxiliary information determining means.

The operation of the recorder/reproducer structured as described above will be described below.

In this embodiment, a case will be shown in which data files stored in the recorder/reproducer are transferred into the PC and recorded therein. The blocks denoted by the same reference numerals as those of the seventh to the twelfth embodiments have the same functions.

The data input from the recording/reproduction processing circuit 86 is input to the data format converting means 305 and converted.

The DVC data analyzing means 301 connected to the data format converting means 305 outputs to a buffer the data pattern of each packet provided on the memory in a prescribed order while analyzing the track number of the currently output data and the number of each packet, etc.

The address generating means 303 generates an address to which data of each packet can be assigned. The auxiliary information determining means 306 obtains a flag representative of whether the data recorded from auxiliary information is recorded in the 25-Mbps mode or in the 12.5 Mbps mode and a flag representative of whether data is written twice or not, and switches the operation of the address generating means 303. The amount of data input in a predetermined time is measured by the DVC data analyzing means 301. Invalid data of an amount corresponding to the difference from the recording data amount is generated by the invalid data generating: means 211 and added to the input data, and then, recording is performed.

The data recorded in the 25-Mbps mode is of the format of (a) of FIG. 20 and the data recorded in the 12.5-Mbps mode is of the format of (b) of FIG. 20, and from the data recording area thereof, PC data is output.

According to the above-described embodiment, by capitalizing on a characteristic that the position of the codeword of the direct current component which is the start position of each small block is fixed and when the end-of-block code is added, the area from there to the start position of the next small block becomes a data area invalid for decoding and reproduction of the existing digital VTR, data files can be reproduced from a recording medium on which data files: other than video signals and sound signals of a predetermined format are recorded. Moreover, by the above-described operation, from tape provided with both a recording function of the existing digital VTR and a function of recording of data other than digital VTR data, switching therebetween and simultaneously therewith, recording in which format data is recorded together with the data, when the cassette has the MIC which is an external storage device, determination may be performed by use of information recorded therein (Fourteenth Embodiment)

Figure 28:
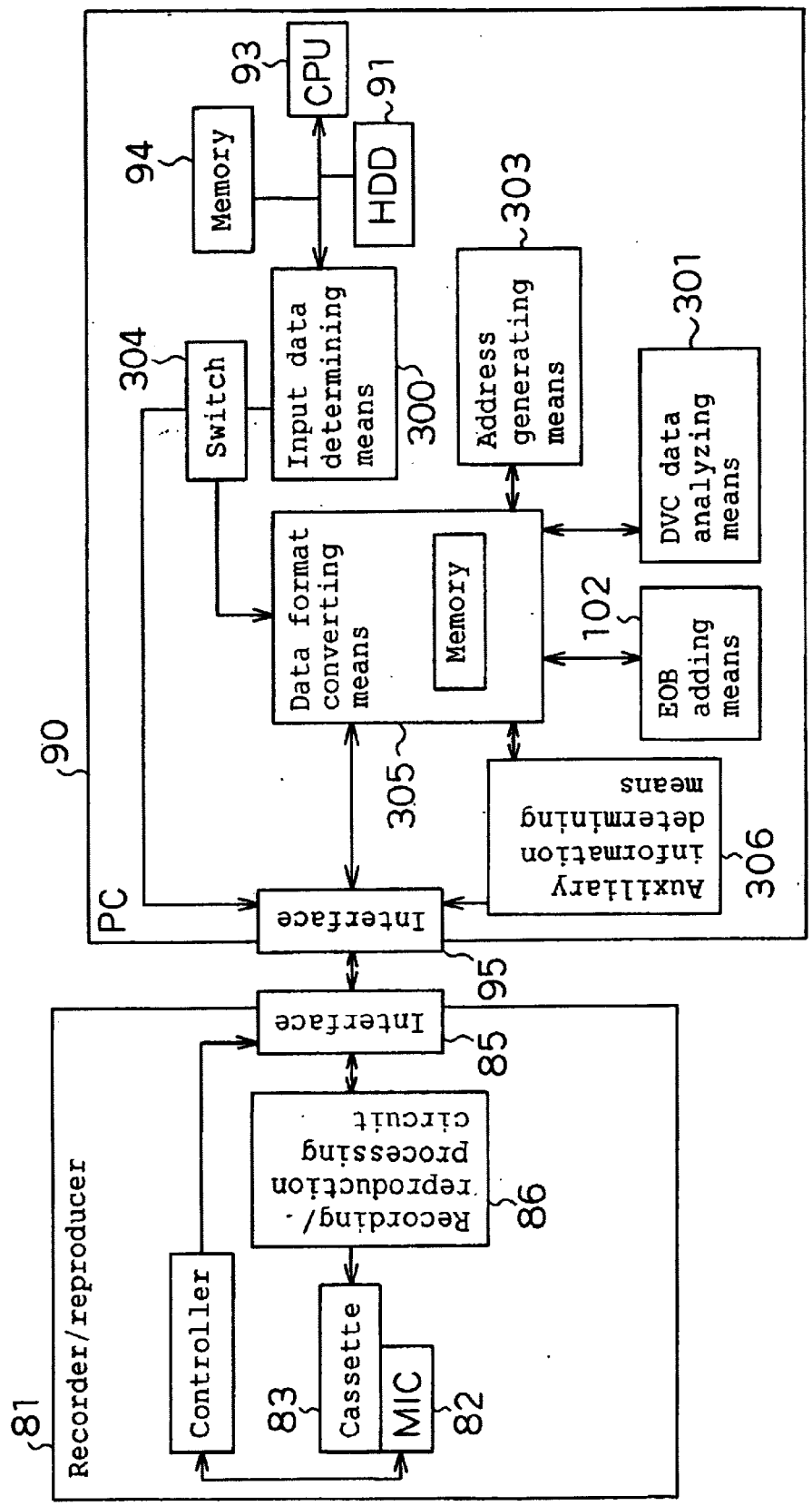
FIG. 28 is a block diagram of the structure of an apparatus for realizing a data recording method according to a fourteenth embodiment.

FIG. 28 is a block diagram of a recorder/reproducer according to a fourteenth embodiment of the present invention. In FIG. 28, reference numeral 300 represents input data determining means, reference numeral 301 represents DVC data analyzing means, reference numeral 303 represents address generating means, reference numeral 304 represents a switch, reference numeral 305 represents data format converting means, and reference numeral 306 represents auxiliary information determining means.

The operation of the recorder/reproducer structured as described above will be described below.

In this embodiment, a case will be shown in which data files stored in the recorder/reproducer are transferred into the PC and recorded therein. The blocks denoted by the same reference numerals as those of the seventh to the thirteenth embodiments have the same functions.

The input data determining means 300 determines whether the data input from the recording/reproduction processing circuit 86 is DVC data or not.

When it is determined as a result of the determination that the input data is DVC data, the input data is output as it is by the switch 304. In this case, the data is output in a DVC packet format as shown in FIG. 19.

When the input data is other than DVC data, that is, in the format shown in FIG. 20, the input data is switched by the switch 304 and input to the data format converting means 305 to be converted.

The DVC data analyzing means 301 connected to the data format converting means 305 outputs to a buffer the data pattern of each packet provided on the memory in a prescribed order while analyzing the track number of the currently output data and the number of each packet, etc. The address generating means 303 generates an address to which data of each packet can be assigned. The auxiliary information determining means 306 obtains a flag representative of whether the data recorded from auxiliary information is recorded in the 25-Mbps mode or in the 12.5 Mbps mode and a flag representative of whether data is written twice or not, and switches the operation of the address generating means 303.

The data recorded in the 25-Mbps mode is of the format of (a) of FIG. 20 and the data recorded in the 12.5-Mbps mode is of the format of (b) of FIG. 20, and from the data recording area thereof, PC data is output.

When the cassette 83 has the MIC 82 which is an external storage device, determination may be performed by use of information recorded therein.

According to the above-described embodiment, by capitalizing on a characteristic that the position of the codeword of the direct current component which is the start position of each small block is fixed and when the end-of-block code is added, the area from there to the start position of the next small block becomes a data area invalid for decoding and reproduction of an existing digital VTR, data files can be reproduced from a recording medium on which data files other than video signals and sound signals of a predetermined format are recorded. Moreover, by providing both a function of the reproducer/decoder of the existing digital VTR deck and the above-described function and switching therebetween, it is possible to view both tape where data files are recorded and tape where recording is performed with the existing digital VTR deck without any problem.

(Fifteenth Embodiment)

Figure 29:
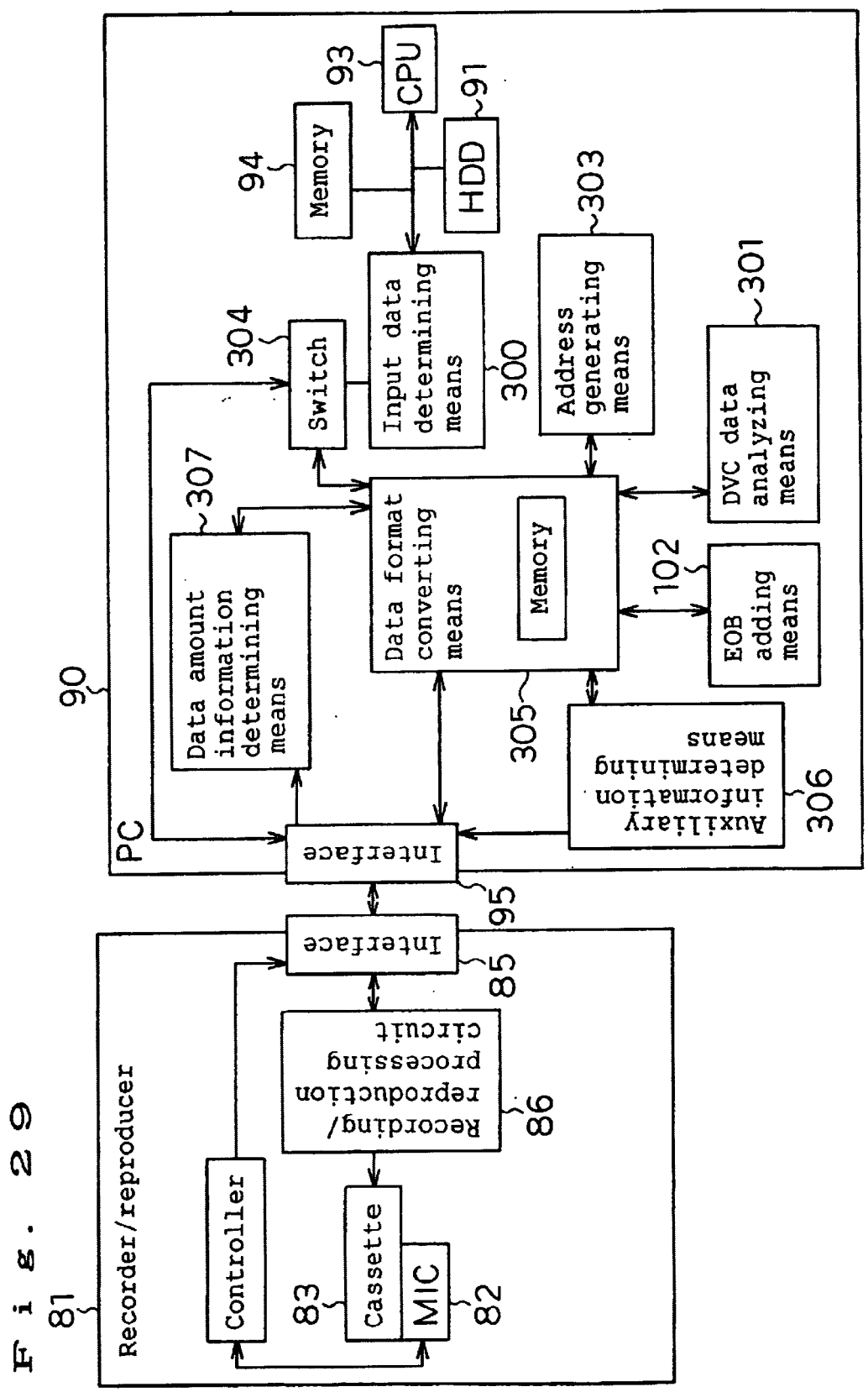
FIG. 29 is a block diagram of the structure of an apparatus for realizing a data recording method according to a fifteenth embodiment.

FIG. 29 is a block diagram of a recorder/reproducer according to a fifteenth embodiment of the present invention. In FIG. 29, reference numeral 300 represents input data determining means, reference numeral 301 represents DVC data analyzing means, reference numeral 303 represents address generating means, reference numeral 304 represents a switch, reference numeral 305 represents data format converting means, reference numeral 306 represents auxiliary information determining means, and reference numeral 307 represents data amount information determining means.

The operation of the recorder/reproducer structured as described above will be described below.

In this embodiment, a case will be shown in which data files stored in the recorder/reproducer are transferred into the PC and recorded therein. The blocks denoted by the same reference numerals as those of the seventh to the fourteenth embodiments have the same functions.

The DVC data analyzing means 301 connected to the data format converting means 305 outputs to a buffer the data pattern of each packet provided on the memory in a prescribed order while analyzing the track number of the currently output data and the number of each packet, etc. The address generating means 303 generates an address to which data of each packet can be assigned. The auxiliary information determining means 306 obtains a flag representative of whether the data recorded from auxiliary information is recorded in the 25-Mbps mode or in the 12.5 Mbps mode and a flag representative of whether data is written twice or not, and switches the operation of the address generating means 303.

The data recorded in the 25-Mbps mode is of the format of (a) of FIG. 20 and the data recorded in the 12.5-Mbps mode is of the format of (b) of FIG. 20, and from the data recording area thereof, PC data is output.

Here, how much data is recorded in one track of 2 Kbytes is determined from the data amount information of the input signal by use of the data amount information determining means 307. The data succeeding the determined data amount is removed as invalid data, and thereafter, the data is output.

By the above-described operation, by providing both a recording function of the existing digital VTR deck and a function of recording of data other than digital VTR data, switching between these functions and simultaneously therewith, recording in which format recording is performed together with the data, both data files and existing digital VTR data can be recorded without any problem.

According to the above-described operation, by obtaining in-track data amount information of each track in the input digital video and audio coded signal and outputting only the data amount represented by the in-track data amount information from a general-purpose data recording area in each track in the digital video and audio coded signal, the data input at a variable rate can correctly be reproduced.

While the data amount is the data amount in one track in the above-described embodiment, a different unit such as ten tracks as the setting at the time of input may be used. Moreover, when the cassette 83 has the MIC 82 which is an external storage device, determination may be performed by use of information recorded therein.

(Sixteenth Embodiment)

Figure 30:
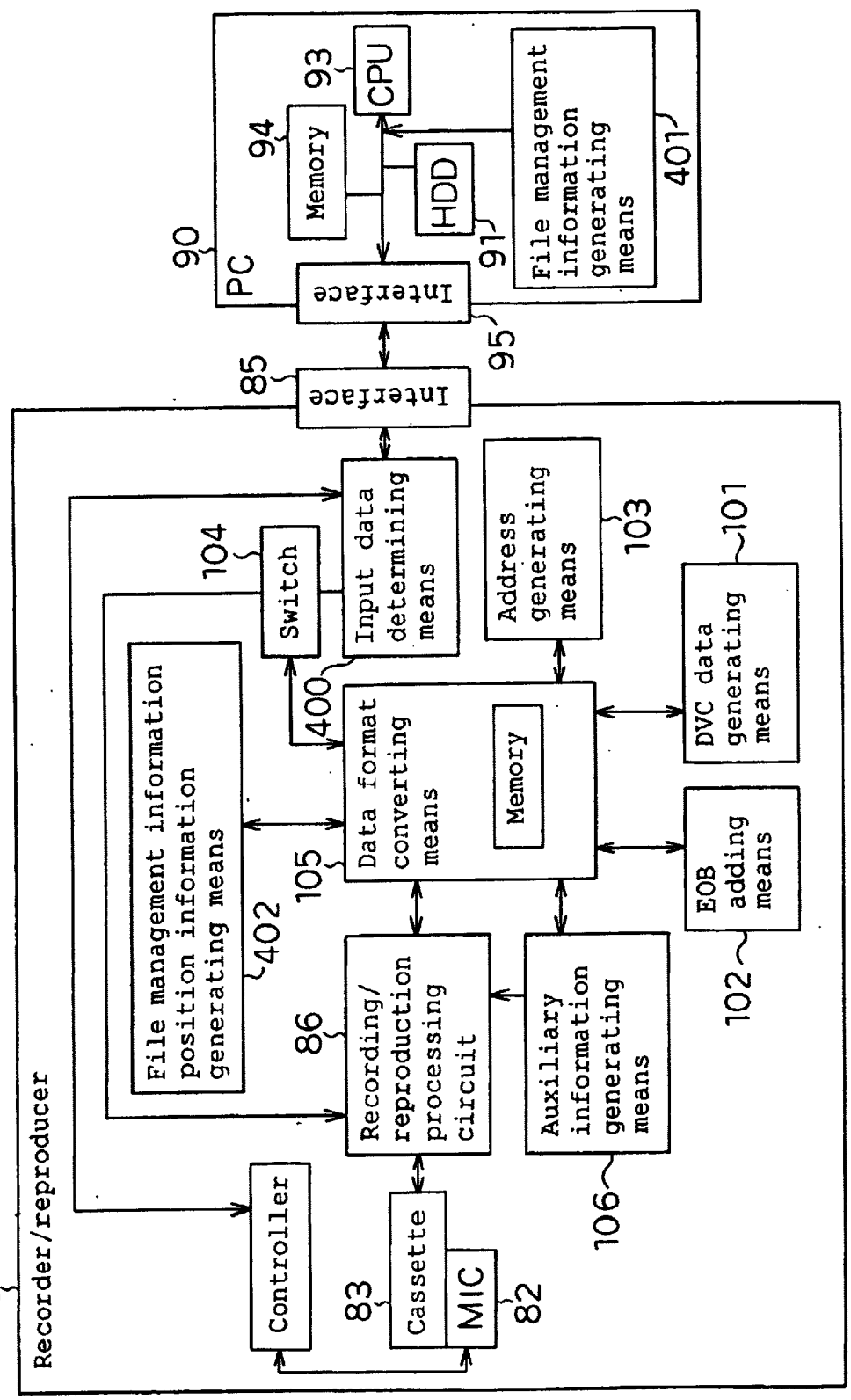
FIG. 30 is a block diagram of the structure of an apparatus for realizing a data recording method according to a sixteenth embodiment.

FIG. 30 is a block diagram of a recorder/reproducer according to a sixteenth embodiment of the present invention. In FIG. 30, reference numeral 400 represents input data determining means, reference numeral 401 represents file management information generating means, and reference numeral 402 represents file management information position information generating means.

The operation of the recorder/reproducer structured as described above will be described below.

In this embodiment, a case will be shown in which data files stored in the hard disk in the PC are transferred to the recorder/reproducer and recorded thereonto. The blocks denoted by the same reference numerals as those of the seventh to the fifteenth embodiments have the same functions.

It is assumed that data on the PC is input and recorded onto the recorder/reproducer, for example, by the method shown in the seventh embodiment.

At this time, management information for handling data recorded on the DVC as files from the PC 90, etc. is generated by the file management information generating means 401. Specifically, regarding a certain continuous section on the tape as a file, the name, the start position, the size and the recording date and time of the file are generated. The generated data is transmitted similarly to normal data at a timing set in the PC 90, for example, immediately before the end of a program of connection to the DVC.

Here, files are not only data files; data of the existing digital VTR can be handled similarly to data files by deciding the file start position, the file end position or the track number as one file unit and adding the name, the update date and time and the like.

The input data determining means 400 determines whether the data input from the hard disk 91 of the PC 90 is DVC data or not and is file management information or not. In doing this, the condition of the data to be output, for example, whether the data is compliant with the 25-Mbps mode of the DVC standard or the low-rate 12.5-Mbps is also determined by the input data determining means 400. When it is determined as a result of the determination that the input data is file management data, the input data is switched by the switch 104 and input to the data format converting means 105.

The DVC data generating means 101 connected to the data format converting means 105 outputs to a buffer the data pattern of each packet provided on the memory in a prescribed order. In doing this, successively changing values such as the track number of the currently output data and the number of each packet are output after successively rewritten by a counter. The address generating means 103 generates an address to which data of each packet can be assigned.

Like in the seventh embodiment, data other than DVC data is recorded in a DVC packet in the format of (a) of FIG. 20 in the 25-Mbps mode and in the format of (b) of FIG. 20 in the 12.5-Mbps mode.

Based on the input from the input data determining means 400, the auxiliary information generating means 106 generates a flag representative of whether the recorded data is DVC data recorded as it is or not, a flag representing that the recorded data is file management information and a flag representative of whether recording is performed in the 25-Mbps mode or in the 12.5-Mbps mode, and adds the flags to the input data.

The file management information recording position information generating means 402 generates information on the file management information recording position on the tape and multiplexes the information in the input signal. This information may be recorded in a specific position such as the head on the tape or on the MIC 82; or may be written, as auxiliary information representing that the track is a track where the file management information is recorded, on all the tracks on which the file management information is recorded.

The data on which the above-described conversion is performed is recorded on the cassette 83 by the recording/reproduction processing circuit 86.

The data can be written twice for enhancement of error durability.

According to the above-described embodiment, by setting an area similarly to the area provided for recording of data files and recording management information of each file, for example, the name of the file, the update date and time of the file, the file start position information, the file size, the file end position information or the track number information, a function such as access in units of file which is possible in a hard disk connected to a PC can be realized, and it is possible to easily find the contents of data in a recording medium and to quickly access to the position of the contents that the user intends to view.

(Seventeenth Embodiment)

Figure 31:
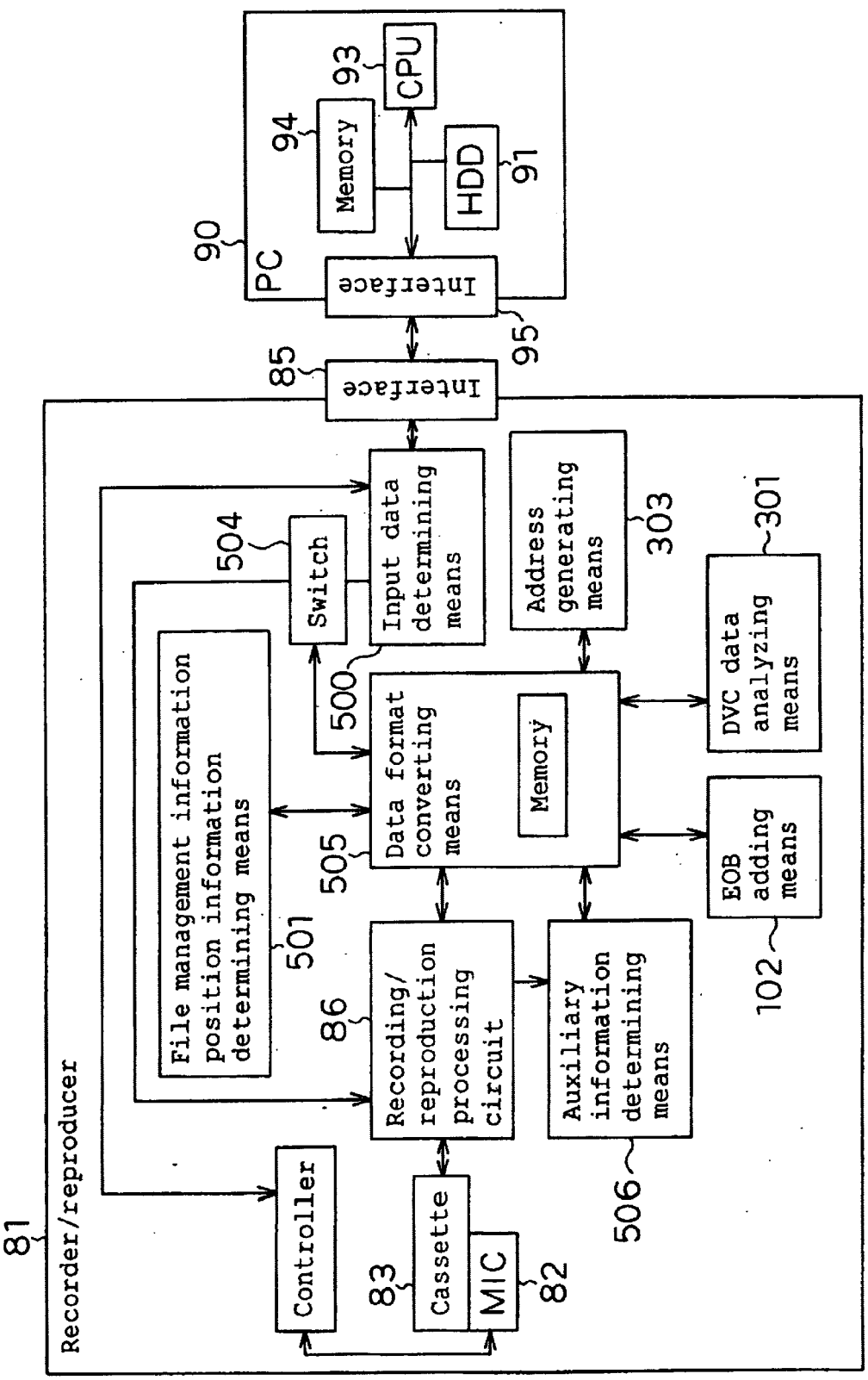
FIG. 31 is a block diagram of the structure of an apparatus for realizing a data recording method according to a seventeenth embodiment.

FIG. 31 is a block diagram of a recorder/reproducer according to an embodiment of the present invention. In FIG. 31, reference numeral 500 represents input data determining means, reference numeral 301 represents DVC data analyzing means, reference numeral 303 represents address generating means, reference numeral 504 represents a switch, reference numeral 505 represents data format converting means, and reference numeral 506 represents auxiliary information determining means.

The operation of the recorder/reproducer structured as described above will be described below.

In this embodiment, a case will be shown in which data files stored in the hard disk in the PC are transferred to the recorder/reproducer and recorded thereonto. The blocks denoted by the same reference numerals as those of the seventh to the sixteenth embodiments have the same functions.

The file management information recording position determining means 501 determines the file management information recording position on the tape and transports the tape to the position. To do this, the file management information recording position information on the tape or on the MIC may be read out or auxiliary information representing that the track is a track where the file management information is recorded may be read out.

The input data determining means 500 determines whether the data input from the recording/reproduction processing circuit 86 is DVC data or nor and is file management information or not.

When it is determined as a result of the determination that the input data is DVC data, the input data is output as it is by the switch 504. In this case, the data is output in a DVC packet format as shown in FIG. 19.

When the input data is other than DVC data, that is, in the format shown in FIG. 20, the input data is switched by the switch 504 and input to the data format converting means 505 to be converted.

The DVC data analyzing means 301 connected to the data format converting means 505 outputs to a buffer the data pattern of each packet provided on the memory in a prescribed order while analyzing the track number of the currently output data and the number of each packet, etc. The address generating means 303 generates an address to which data of each packet can be assigned. The auxiliary information determining means 506 obtains a flag representative of whether the data recorded from auxiliary information is recorded in the 25-Mbps mode or in the 12.5 Mbps mode and a flag representative of whether data is written twice or not, and switches the operation of the address generating means 303.

The data recorded in the 25-Mbps mode is of the format of (a) of FIG. 20 and the data recorded in the 12.5-Mbps mode is of the format of (b) of FIG. 20, and from the data recording area thereof, PC data is output.

When the cassette 83 has the MIC 82 which is an external storage device, determination may be performed by use of information recorded therein.

The above-described operation can be realized by means of software, and the functions may be replaced by software. By recording this program on a recording medium such as a floppy disk for conveyance, the above-described operation can easily be realized by another independent computer system.

Figure 32A:
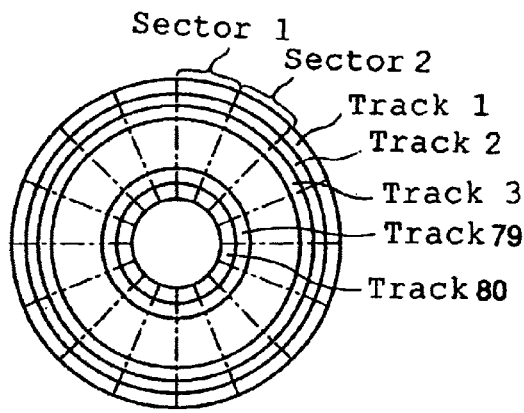
FIG. 32 is a block diagram of the structure of an apparatus for realizing a recording method by means of software.
Figure 32B:
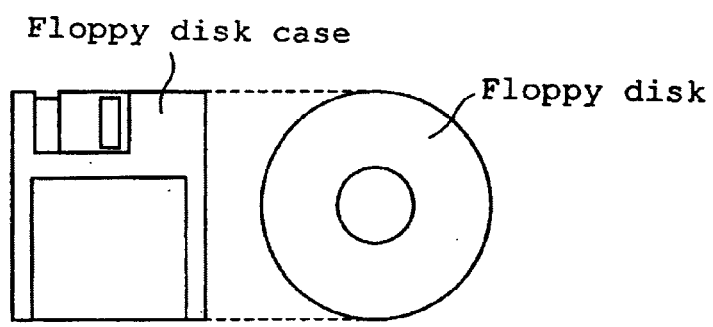
Figure 32C:
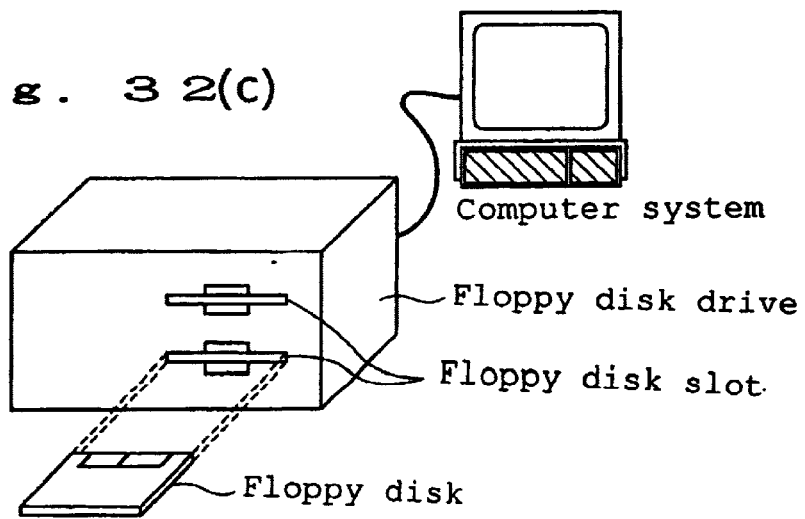

FIG. 32 shows an example in which software is stored in a floppy disk.

(a) of FIG. 32 shows an example of a physical format of a floppy disk which is a recording medium main unit. Tracks are concentrically formed from the outer radius to the inner radius and divided into 16 sectors in the angular direction. In accordance with the thus allocated areas, the program according to the embodiment of the present invention is recorded. (b) of FIG. 32 is a view of assistance in explaining a case for housing the floppy disk. From the left, the front view of the floppy disk case, the cross-sectional view thereof and the floppy disk are shown. Thus, by housing the floppy disk in the case, the disk can be protected from dust and external shock and safely be conveyed.

(c) of FIG. 32 is a view of assistance in explaining recording and reproduction of the program onto and from the floppy disk. By connecting a floppy disk drive to a computer system as shown in the figure, the program can be recorded onto and reproduced from the disk. The disk is inserted into and taken out of the floppy disk drive through a slot. In the case of recording, the program is recorded onto the disk by the computer system. In the case of reproduction, the floppy disk reads out the program from the disk and transmits it to the computer system. While explanation has been given with a floppy disk as the recording medium, the recording medium is not limited thereto; the present invention can similarly be carried out as long as one on which a program is recorded such as an optical disk, an IC card and a ROM cassette is used.

INDUSTRIAL APPLICABILITY

According to the above-described embodiments, by setting an area similarly to the area provided for recording of data filed and recording management information of each file, for example, the name of the file, the update date and time of the file, the file start position information, the file size, the file end position information or the track number information, a function such as access in units of file which is possible in a hard disk connected to a PC can be realized, and it is possible to easily find the contents of data in a recording medium and to quickly access to the position of the contents that the user intends to view.

What is claimed is:

1. A recorder/reproducer for recording and reproducing a digital video and audio coded signal of a predetermined format onto and from a recording medium, the digital video and audio coded signal including a codeword of a direct current component of each small block of a frame located in a fixed position in a recording packet, the recorder/reproducer comprising:
   means of adding an end-of-block code representing that a codeword of a small block is discontinued hereinafter, in an area to which the codeword of the small block is assigned, means of setting a part of the area of the small block which is behind the end-of-block code a general-purpose data recording area, and means of assigning input data to the general-purpose data recording area.

2. A recorder/reproducer according to claim 1, wherein the end-of-block code is disposed immediately behind the codeword of the direct current component of the small block.

3. A recorder/reproducer according to claim 1, wherein (1) a part in a predetermined recording packet, which part is behind the end-of-block code of each small block, is set as an added information recording area, (2) a part in the remaining recording packets, which part is behind the end-of-block code of each small block, is set as the general-purpose data recording area, (3) the input data is recorded in the general-purpose recording area, and (4) added information, which is information on the input data, is recorded in the added information recording area.

4. A recorder/reproducer according to claim 3, wherein the added information is repetitively recorded several times in the added information recording area.

5. A recorder/reproducer according to claim 1, wherein when the input data is a digital video and audio coded signal of a predetermined format, the input data is recorded as it is, and when the input data is other than the digital video and audio coded signal of the predetermined format, the input data is assigned to the general-purpose data recording area.

6. A recorder/reproducer according to claim 5, wherein a data-type-specific code representative of a type of recorded data is recorded in a predetermined position of a track which is a cluster of a predetermined number of recording packets.

7. A recorder/reproducer according to claim 1, wherein in-track data amount information representative of an amount of data actually recorded on each track is recorded in a predetermined position in each track.

8. A recorder/reproducer according to claim 1, wherein recording is performed after the data in the general-purpose data recording area in a track is all invalidated, and invalid track information representing that the data in the general-purpose data recording area in the track is all invalid is recorded in a predetermined position in the track.

9. A recorder/reproducer according to claim 1, wherein data input as one file is recorded on a continuous track.

10. A recorder/reproducer for recording and reproducing a digital video and audio coded signal of a predetermined format onto and from a recording medium, the digital video and audio coded signal including a direct current component of each small block of a frame, class information defining a method of quantizing each small block and motion information on motion of each small block from a previous frame located in a fixed position in a recording packet, the digital recording/reproducer comprising:

means of setting (1) a part of an area to which a codeword of a small block is assigned, which part is behind an end-of-block code, (2) an area where the class information is recorded and (3) an area where the motion information is recorded as a general-purpose data recording area, and means of assigning input data to the general-purpose data recording area.

11. A recorder/reproducer according to claim 10, wherein the end-of-block code is disposed immediately behind the codeword of the direct current component of the small block.

12. A recorder/reproducer according to claim 10, wherein a part in a predetermined recording packet, which part is behind the end-of-block code of each small block is set as an added information recording area, a part in the remaining recording packets, which part is behind the end-of-block code of each small block is set as the general-purpose data recording area, the input data is recorded in the general-purpose recording area, and added information which is information on the input data is recorded in the added information recording area.

13. A recorder/reproducer according to claim 10, wherein when the input data is a digital video and audio coded signal of a predetermined format, the input data is recorded as it is, and when the input data is other than the digital video and audio coded signal of the predetermined format, the input data is assigned to the general-purpose data recording area.

14. A recorder/reproducer according to claim 10, wherein in-track data amount information representative of an amount of data actually recorded on each track is recorded in a predetermined position in each track.

15. A recorder/reproducer according to claim 10, wherein recording is performed after the data in the general-purpose data recording area in a track is all invalidated, and invalid track information representing that the data in the general-purpose data recording area in the track is all invalid is recorded in a predetermined position in the track.

16. A recorder/reproducer according to claim 10, wherein data input as one file is recorded on a continuous track.

17. A converting method for converting input data into a format of a digital video and audio coded signal having units of a predetermined transmission packet, where a direct current component of each small block constituting a frame is present in a fixed position in the transmission packet, the method comprising the steps of:

adding an end-of-block code in an area where a codeword of each of the small blocks is disposed, setting a part of the area of the codeword of the small block, which is behind the end-of-block code as a general-purpose data disposition area, and disposing the data is in the general-purpose data disposition area.

18. A converting method according to claim 17, wherein conversion is performed with the end-of-block code being disposed immediately behind the codeword of the direct current component of the small block.

19. A converting method according to claim 17, wherein conversion is performed so that the input data is disposed in the general-purpose data recording area of a predetermined recording packet and added information which is information on the data is disposed in the general-purpose data recording areas of the other recording packets.

20. A converting method according to claim 17, wherein when the input data is a digital video and audio coded signal of a predetermined format, the input data is output as it is, and when the input data is other than the digital video and audio coded signal of the predetermined format, the input data is disposed in the general purpose recording area.

21. A converting method according to claim 20, wherein conversion is performed with a data-type-specific code representative of a type of the input data being added so as to be disposed in a predetermined position of a track.

22. A converting method according to claim 17, wherein conversion is performed with in-track data amount information representative of an amount of data actually assigned to each track being added so as to be disposed in a predetermined position of each track.

23. A converting method according to claim 17, wherein data disposed so that data in the general-purpose recording area in each track is all invalid is generated, and conversion is performed with invalid track information representing that the data in the general-purpose data recording area in each track is all invalid being added so as to be disposed in a predetermined position in each track.

24. A converting method according to claim 17, wherein data input as one file is converted so as to be disposed on a continuous track.

25. A converting method for converting input data into a format of a digital video and audio coded signal having units of a predetermined transmission packet, where a direct current component of each small block constituting a frame, class information and motion information are present in a fixed position in the transmission packet, the method comprising the steps of:

setting (1) a part of an area where a codeword of each small block is disposed, which part is behind an end-of-block code, (2) an area where class information is recorded and (3) an area where motion information is recorded are set a general-purpose data disposition area, and disposing the data in the general-purpose data disposition area.

26. A converting method according to claim 25, wherein conversion is performed with the end-of-block code being disposed immediately behind the codeword of the direct current component of the small block.

27. A converting method according to claim 25, wherein conversion is performed so that the input data is disposed in the general-purpose data recording area of a predetermined recording packet and added information which is information on the data is disposed in the general-purpose data recording areas of the other recording packets.

28. A converting method according to claim 25, wherein when the input data is a digital video and audio coded signal of a predetermined format, the input data is output as it is, and when the input data is other than the digital video and audio coded signal of the predetermined format, the input data is disposed in the general purpose recording area and converted.

29. A converting method according to claim 25, wherein conversion is performed with in-track data amount information representative of an amount of data actually assigned to each track being added so as to be disposed in a predetermined position of each track.

30. A converting method according to claim 25, wherein data disposed so that data in the general-purpose recording area in each track is all invalid is generated, and conversion is performed with invalid track information representing that the data in the general-purpose data recording area in each track is all invalid being added so as to be disposed in a predetermined position in each track.

31. A converting method according to claim 25, wherein data input as one file is converted so as to be disposed on a continuous track.

32. A converting method using as an input signal a digital video and audio coded signal having a format where a codeword of a direct current component of each small block of a frame is present in a fixed position in a transmission packet, the method comprising the steps of:
setting a part of an area, where the codeword of each small block of the input signal is disposed, which part is behind an end-of-block code, as a general-purpose data area, and outputting data from the general-purpose data area as converted data.

33. A converting method according to claim 32, wherein a data-type-specific code is detected from the input signal, and when the data-type-specific code represents that a digital video and audio coded signal of a predetermined format is recorded, the input signal is output, and when the data-type-specific code represents that data other than the digital video and audio coded signal of the predetermined format is recorded, data is output from the general-purpose data area.

34. A converting method according to claim 32, wherein in-track data amount information of each track of the input signal is obtained, and only data of an amount represented by the in-track data amount information is output from the general-purpose data recording area in each track of the digital video and audio coded signal.

35. A converting method according to claim 32, wherein invalid track information of each track of the input signal is searched for, and data is not output as from the general-purpose data recording area of a track having invalid track information detected.

36. A converting method using as an input signal a digital video and audio coded signal having a format where a codeword of a direct current component of each small block of a frame, class information and motion information are present in a fixed position in a transmission packet, the method comprising the steps of:
setting (1) a part of an area where the codeword of each small block of the input signal is disposed, which part is behind an end-of-block code, (2) an area where the class information is recorded and (3) an area where the motion information is recorded as a general-purpose data area, and outputting data from the general-purpose data area as converted data.

37. A converting method according to claim 36, wherein a data-type-specific code is detected from the input signal, and when the data-type-specific code represents that a digital video and audio coded signal of a predetermined format is recorded, the input signal is output, and when the data-type-specific code represents that data other than the digital video and audio coded signal of the predetermined format is recorded, data is output from the general-purpose data area.

38. A converting method according to claim 36, wherein in-track data amount information of each track of the input signal is obtained, and only data of an amount represented by the in-track data amount information is output from the general-purpose data recording area in each track of the digital video and audio coded signal.

39. A converting method according to claim 36, wherein invalid track information of each track of the input signal is searched for, and no data is output as effective data from the general-purpose data recording area of a track where the invalid track information is detected.

40. A recorder/reproducer for recording and reproducing a digital video and audio coded signal of a predetermined format in units of a predetermined recording packet,
in which a codeword of a direct current component of each small block of a frame is located in a fixed position in the recording packet, the recorder/reproducer comprising:
means of adding an end-of-block code in an area to which the codeword of each small block in a predetermined track is assigned, means of setting a part of the area to which the codeword of the small block is assigned, which part is behind the end-of-block code, as a file management information recording area, and means of assigning file management information, which is information on files recorded in a recording medium is to the file management information recording area.

41. A recorder/reproducer according to claim 40, wherein the-end-of block code is added immediately behind a code of the direct current component of each small block.

42. A recorder/reproducer according to claim 40, wherein the file management information is recorded on a continuous track.

43. A recorder/reproducer according to claim 40, wherein the file management information is recorded behind data recorded on the recording medium.

44. A recorder/reproducer according to claim 40, wherein in a latest file management information recording area, latest management information of all the files on the recording medium is recorded.

45. A recorder/reproducer according to claim 40, wherein when the file management information is recorded, the file management information recording area that is already present on the recording medium is invalidated.

46. A recorder/reproducer according to claim 40, wherein when data is newly recorded on a recording medium where data and file management information on the data are recorded, a previous file management information recording area is overwritten with the newly recorded data.

47. A recorder/reproducer according to claim 40, wherein as the file management information, the following are used: an update data and time of each file; file start position information which is information on a start position, on a recording medium, of each file; information on a file size; and file end position information which is information on an end position of a file on a recording medium, or track number information which is information on the number of tracks used for file recording.

48. A recorder/reproducer according to claim 40, wherein a file start flag which is information representing that a start position of a file is present is recorded in a predetermined position on a track where a start position of each file is present.

49. A recorder/reproducer according to claim 40, wherein a file end flag which is information representing that an end position of a file is present is recorded in a predetermined position on a track where an end position of each file is present.

50. A recorder/reproducer according to claim 40, wherein a file ID flag which is information for distinguishing the file from other files is recorded in a predetermined position on a track where each file is present.

51. A recorder/reproducer according to claim 40, wherein in a track in the file management information recording area, a file management information track flag which is information representing that said track is a track in the file management information recording area is set.

52. A recorder/reproducer according to claim 40, wherein an index ID which is information representative of a break of data is set in a track where the file management information recording area is present.

53. A recorder/reproducer according to claim 40, wherein to delete the file management information recording area, at least a file management information track flag and an index ID are rewritten so as to be invalidated.

54. A recorder/reproducer according to claim 40, wherein file management information presence information which is information representing whether the file management information recording area is written on the recording medium or not is recorded.

55. A recorder/reproducer according to claim 40, wherein file management information presence information is stored in an auxiliary information storage medium attached to a case housing the recording medium.

56. A recorder/reproducer according to claim 40, wherein file management information area position information which is information on a position, on the recording medium, of the file management information recording area is stored in an auxiliary information storage medium attached to a case housing the recording medium.

57. A recorder/reproducer for recording and reproducing a digital video and audio coded signal of a predetermined format in units of a predetermined recording packet,
in which a direct current component of each small block of a frame, class information and motion information are present in a fixed position in the recording packet, the recorder/reproducer comprising:
means of setting (1) a part of an area to which a codeword of each small block is assigned, which part is behind an end-of-block code, (2) an area where the class information is recorded and (3) an area where the motion information is recorded as a file management information recording area, and means of assigning file management information to the file management information recording area.

58. A recorder/reproducer according to claim 57, wherein the-end-of block code is added immediately behind a code of the direct current component of each small block.

59. A recorder/reproducer according to claim 57, wherein the file management information is recorded on a continuous track.

60. A recorder/reproducer according to claim 57, wherein the file management information is recorded behind data recorded on the recording medium.

61. A recorder/reproducer according to claim 57, wherein in a latest file management information recording area, latest management information of all the files on the recording medium is recorded.

62. A recorder/reproducer according to claim 57, wherein when the file management information is recorded, the file management information recording area that is already present on the recording medium is invalidated.

63. A recorder/reproducer according to claim 57, wherein when data is newly additionally recorded on a recording medium where data and file management information on the data are recorded, a previous file management information recording area is overwritten with the newly added recorded data.

64. A recorder/reproducer according to claim 57, wherein as the file management information, the following are used: an update data and time of each file; file start position information which is information on a start position, on a recording medium, of each file; information on a file size; and file end position information which is information on an end position of a file on a recording medium, or track number information which is information on the number of tracks used for file recording.

65. A recorder/reproducer according to claim 57, wherein a file start flag which is information representing that a start position of a file is present is recorded in a predetermined position on a track where a start position of each file is present.

66. A recorder/reproducer according to claim 57, wherein a file end flag which is information representing that an end position of a file is present is recorded in a predetermined position on a track where an end position of each file is present.

67. A recorder/reproducer according to claim 57, wherein a file ID flag which is information for distinguishing the file from other files is recorded in a predetermined position on a track where each file is present.

68. A recorder/reproducer according to claim 57, wherein in a track in the file management information recording area, a file management information track flag which is information representing that said track is a track in the file management information recording area is set.

69. A recorder/reproducer according to claim 57, wherein an index ID which is information representative of a break of data is set in a track where the file management information recording area is present.

70. A recorder/reproducer according to claim 57, wherein to delete the file management information recording area, at least a file management information track flag and an index ID are rewritten so as to be invalidated.

71. A recorder/reproducer according to claim 57, wherein file management information presence information which is information representing whether the file management information recording area is written on the recording medium or not is recorded.

72. A recorder/reproducer according to claim 57, wherein file management information presence information is stored in an auxiliary information storage medium attached to a case housing the recording medium.

73. A recorder/reproducer according to claim 57, wherein file management information: area position information which is information on a position, on the recording medium, of the file management information recording area is stored in an auxiliary information storage medium attached to a case housing the recording medium.

74. A converting method for converting input data into a format of a digital video and audio coded signal having units of a predetermined transmission packet, where a direct current component of each small block of a frame is present in a fixed position in the transmission packet, the method comprising the steps of:
adding an end-of-block code in an area where a codeword of each small block is disposed, setting a part of the area where the codeword of the small block is disposed, which is behind the end-of-block code, as a file management information area, and performing conversion on the data disposed in the file management information area.

75. A converting method according to claim 74, wherein conversion is performed with the end-of-block code being disposed immediately behind the codeword of the direct current component of the small block.

76. A converting method according to claim 74, wherein conversion is performed with the file management information being disposed on a continuous track.

77. A converting method for converting input data into a format of a digital video and audio coded signal having units of a predetermined transmission packet, where a direct current component of each small block of a frame, class information and motion information are present in a fixed position in the transmission packet, the method comprising the steps of:

setting (1) a part of an area where a codeword of each small block is disposed, which part is behind the end-of-block code, (2) an area where the class information is recorded and (3) an area where the motion information is recorded as a file management information area, and performing conversion on the data disposed in the file management information area.

78. A converting method according to claim 77, wherein conversion is performed with the end-of-block code being disposed immediately behind the codeword of the direct current component of the small block.

79. A converting method according to claim 77, wherein conversion is performed with the file management information being disposed on a continuous track.

\* \* \* \* \*